（12）United States Patent
Imaoka

(10) Patent No.: US 9,733,451 B2
(45) Date of Patent: Aug. 15, 2017

(54) DOME CAMERA

(71) Applicant: Panasonic Intellectual Property Management Co., Ltd., Osaka (JP)

(72) Inventor: Takuya Imaoka, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/076,653

(22) Filed: Mar. 22, 2016

(65) Prior Publication Data

US 2016/0205299 A1    Jul. 14, 2016

Related U.S. Application Data

(63) Continuation of application No. PCT/JP2015/000834, filed on Feb. 23, 2015.

(30) Foreign Application Priority Data

Feb. 28, 2014 (JP) .................. 2014-037856
Jan. 14, 2015 (JP) .................. 2015-005350

(51) Int. Cl.
*H04N 5/238* (2006.01)
*H04N 5/225* (2006.01)
(Continued)

(52) U.S. Cl.
CPC ............. *G02B 13/00* (2013.01); *G02B 13/08* (2013.01); *G02B 13/18* (2013.01); *G02B 15/20* (2013.01); *G03B 17/561* (2013.01); *G08B 13/19619* (2013.01); *H04N 5/2252* (2013.01); *H04N 5/23296* (2013.01); *H04N 5/2254* (2013.01)

(58) Field of Classification Search
USPC ....... 348/143, 144, 148, 149, 154, 155, 161, 348/335, 340, 344, 345, 351, 369, 375
See application file for complete search history.

(56) References Cited

U.S. PATENT DOCUMENTS

| | | |
|---|---|---|
| 4,291,848 A | 9/1981 | Clark |
| 4,705,343 A | 11/1987 | Simons |
| | (Continued) | |

FOREIGN PATENT DOCUMENTS

| | | |
|---|---|---|
| DE | 690 14 553 | 4/1995 |
| EP | 425365 | 5/1991 |
| | (Continued) | |

OTHER PUBLICATIONS

International Search Report of PCT application No. PCT/JP2015/000834 dated May 19, 2015.

(Continued)

*Primary Examiner* — Lin Ye
*Assistant Examiner* — Euel Cowan
(74) *Attorney, Agent, or Firm* — Wenderoth, Lind & Ponack, L.L.P.

(57) ABSTRACT

A dome camera includes a camera body rotatable and including a lens system and an imaging device, a correction optical system having a curved shape, and a dome cover covering the camera body and the correction optical system. The correction optical system performs at least any one of tilt, decenter, and rotation in accordance with a rotation angle of the camera body.

13 Claims, 26 Drawing Sheets

(51) Int. Cl.
*G03B 13/00* (2006.01)
*G02B 13/00* (2006.01)
*H04N 5/232* (2006.01)
*G02B 13/08* (2006.01)
*G02B 13/18* (2006.01)
*G02B 15/20* (2006.01)
*G08B 13/196* (2006.01)
*G03B 17/56* (2006.01)

(56) References Cited

U.S. PATENT DOCUMENTS

| | | | |
|---|---|---|---|
| 5,526,181 A * | 6/1996 | Kunick | G02B 27/0025 244/3.16 |
| 2006/0024046 A1 | 2/2006 | Jones et al. | |
| 2008/0094480 A1 * | 4/2008 | Swarr | G08B 13/19689 348/211.99 |
| 2012/0169870 A1 * | 7/2012 | Jain | G02B 27/0025 348/143 |
| 2012/0243861 A1 | 9/2012 | Svensson et al. | |
| 2013/0223834 A1 * | 8/2013 | Jikihara | G03B 11/00 396/448 |
| 2013/0272690 A1 | 10/2013 | Aoki et al. | |
| 2014/0333767 A1 | 11/2014 | Jikihara et al. | |
| 2015/0268534 A1 | 9/2015 | Jikihara et al. | |

FOREIGN PATENT DOCUMENTS

| | | |
|---|---|---|
| JP | 7-253534 | 10/1995 |
| JP | 2005-300659 | 10/2005 |
| JP | 2009-302943 | 12/2009 |
| JP | 2012-083464 | 4/2012 |
| JP | 2012-103452 | 5/2012 |
| JP | 2012-205307 | 10/2012 |
| WO | 2013/114986 | 8/2013 |

OTHER PUBLICATIONS

Extended European Search Report issued Nov. 9, 2016 in corresponding European Application No. 15756000.4.

* cited by examiner

FIG. 4A
FIG. 4B
d-LINE
----- F-LINE
--- C-LINE
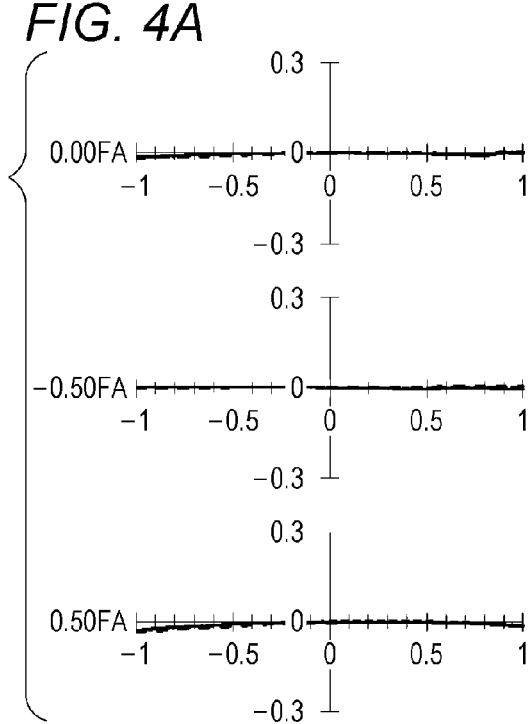
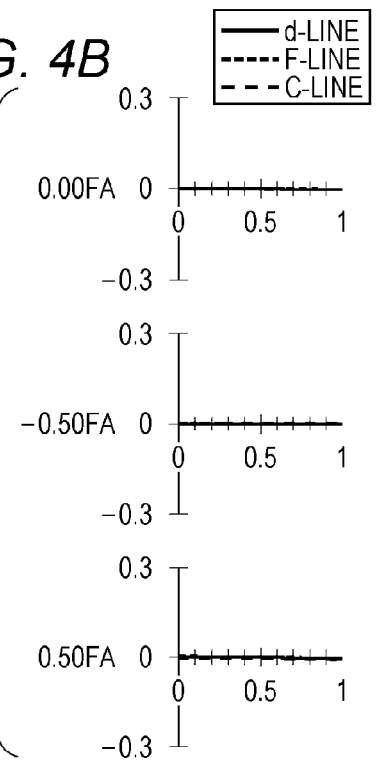
FIG. 4C
FIG. 4D
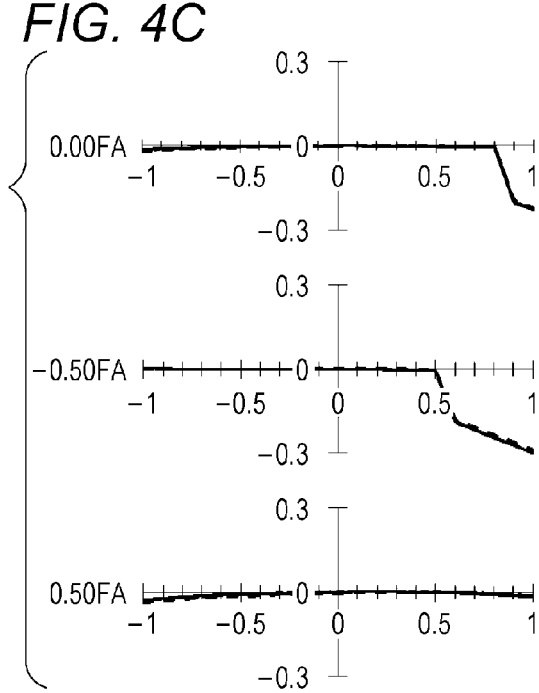
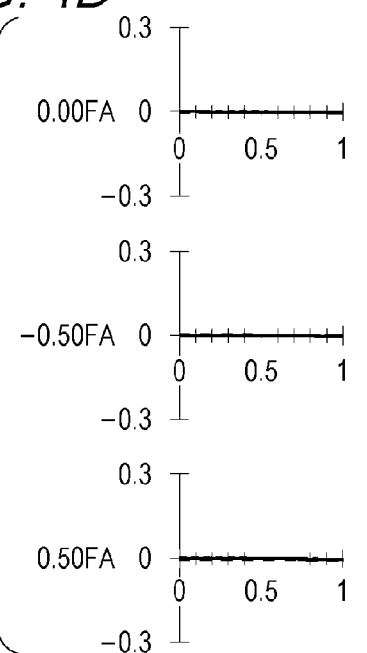

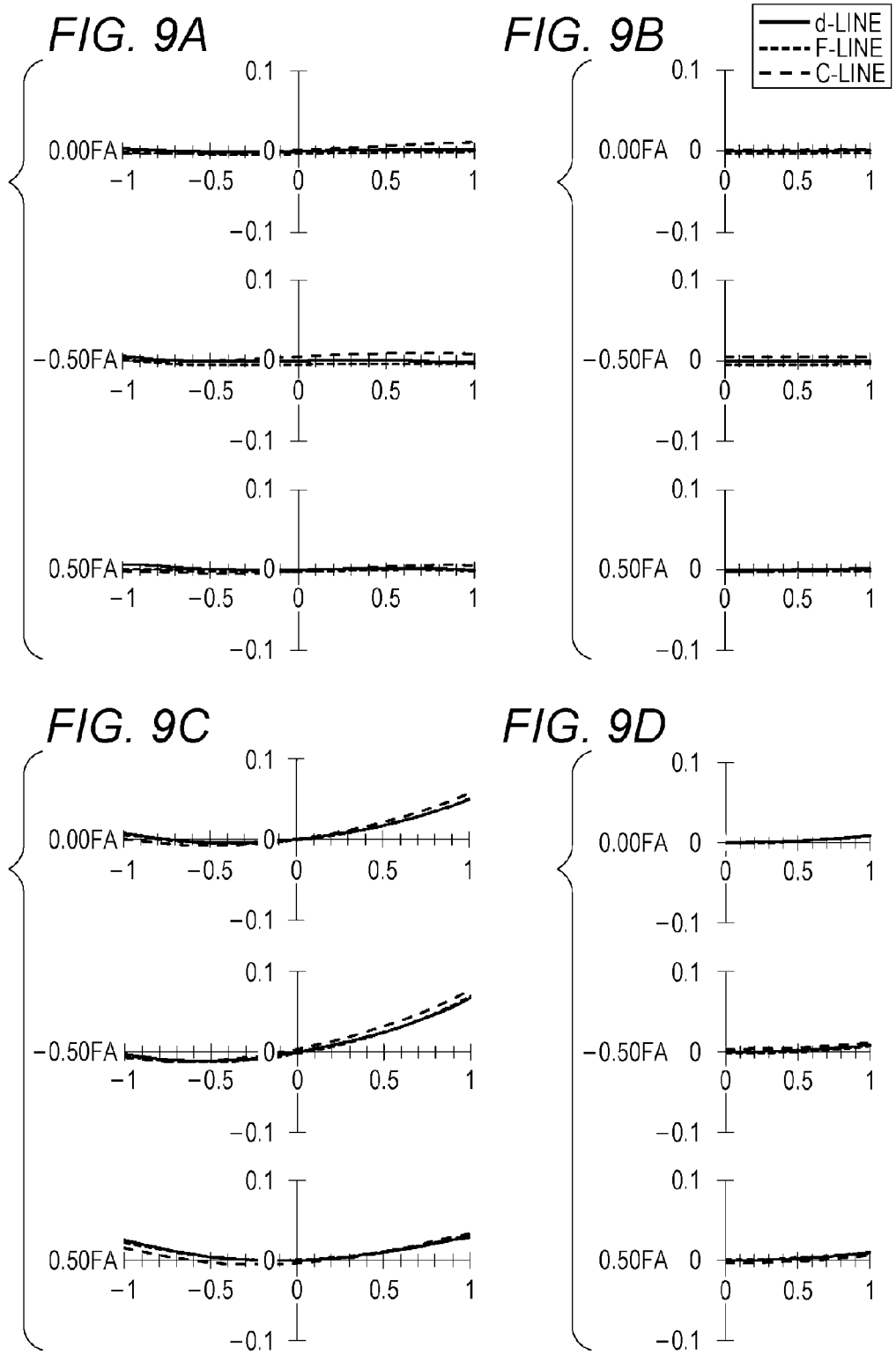

DOME CAMERA

BACKGROUND

1. Technical Field

The present disclosure relates to a dome camera.

2. Description of the Related Art

Unexamined Japanese Patent Publication No. 2012-205307 discloses a monitoring camera system including a dome cover and a camera body. The monitoring camera system includes the dome cover which has a shape of a partial sphere formed by a segment of a sphere split into two or more segments, the camera body which images a subject, and a tilt mechanism which rotates the camera body. The monitoring camera system having this structure is capable of imaging a subject located above a horizontal plane.

SUMMARY

A dome camera includes a camera body rotatable and including a lens system and an imaging device, a correction optical system having a curved shape, and a dome cover covering the camera body and the correction optical system. The correction optical system performs at least any one of tilt, decenter, and rotation in accordance with a rotation angle of the camera body.

BRIEF DESCRIPTION OF DRAWINGS

FIGS. 4A to 4D each illustrate lateral aberration at a tele end of the dome camera according to the first exemplary embodiment in a state corrected by the correction optical system and in a state not corrected by the correction optical system.

FIGS. 9A to 9D each illustrate lateral aberration at a tele end of the dome camera according to the third exemplary embodiment in a state corrected by the correction optical system and in a state not corrected by the correction optical system.

DETAILED DESCRIPTION

Figure 1A:
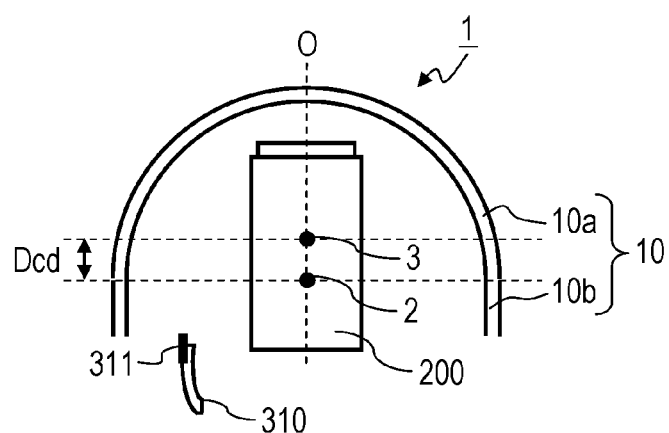
FIG. 1A is an explanatory view illustrating a relationship between operation of a camera body and operation of a correction optical system included in a dome camera according to a first exemplary embodiment in a state of zenith direction imaging.

Exemplary embodiments are hereinafter described with reference to the drawings. In the following description, some excessive details may not be particularly touched upon. For example, detailed explanation of well-known matters, or repeated explanation of substantially identical configurations may not be given. These omissions are made for avoiding unnecessary redundancy of the following description, and helping easy understanding of the present disclosure by those skilled in the art.

The accompanying drawings and the following description are presented by the present inventors not for the purpose of setting any limitations to subject maters defined in the appended claims, but only for the purpose of helping those skilled in the art fully understand the present disclosure.

According to the present disclosure, an action of a correction optical system for performing at least any one of tilt, decenter, and rotation is referred to as a shift of the correction optical system in some cases. In addition, each of a tilt amount, a tilt angle, a rotation angle, a decenter amount and the like of the correction optical system is referred to as a shift amount of the correction optical system in some cases.

First Exemplary Embodiment

A dome camera according to a first exemplary embodiment is hereinafter described with reference to the drawings. Discussed in the first exemplary embodiment by way of example is a dome camera functioning as a monitoring camera or the like.

1-1. Configuration 1-1-1. General Configuration

A general configuration of dome camera 1 according to the first exemplary embodiment is hereinafter described with reference to FIGS. 1A to 1D. Dome camera 1 according to the first exemplary embodiment includes camera body 200, dome cover 10, and movable correction optical system 310.

Camera body 200 disposed inside dome cover 10 contains a lens system and an imaging device. The lens system included in dome camera 1 according to the first exemplary embodiment is a zoom lens system.

Dome cover 10 generally has a cup shape which includes spherical portion 10a having a substantially semispherical shape, and cylindrical portion 10b having a cylindrical shape. Spherical portion 10a and cylindrical portion 10b are formed by integral molding. However, spherical portion 10a and cylindrical portion 10b may be separately molded, and joined to each other after molding. The shape of cylindrical portion 10b is not limited to a cylindrical shape, but may be a conical shape.

Correction optical system 310 is a unit for optically correcting light ray passing through cylindrical portion 10b of dome cover 10. Correction optical system 310 is configured to shift between a retracting state and a correcting state. The retracting state is a state of correction optical system 310 shifted in accordance with rotation angle θc of camera body 200 toward a position out of a range of light ray entering the lens system of camera body 200. The correcting state is a state of correction optical system 310 shifted to a position between dome cover 10 and camera body 200. Operation of correction optical system 310 is further detailed below.

Dome camera 1 includes a pan motor (not shown) and a tilt motor (not shown). Camera body 200 is rotatable in a pan direction and a tilt direction with respect to dome cover 10 by rotations of the pan motor and the tilt motor. Operations of the pan motor and the tilt motor are controlled by a controller such as a microcomputer.

Dome camera 1 includes a correction optical system actuator (not shown) for driving correction optical system 310. Operation of the correction optical system actuator is controlled by a controller such as a microcomputer.

1-1-2. Configuration of Lens System

Figure 2A:
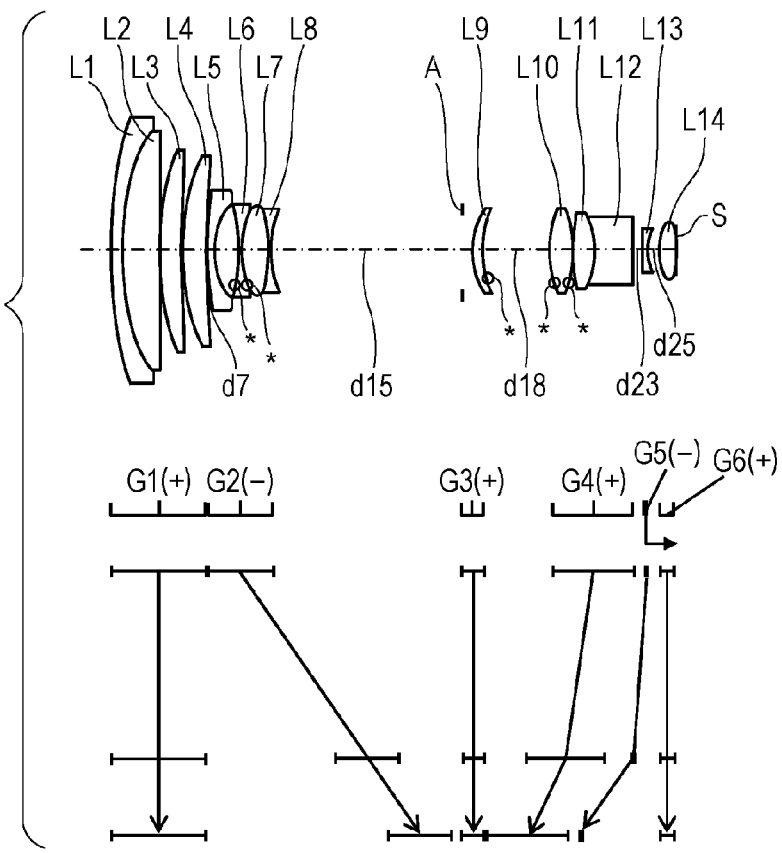
FIGS. 2A to 2C are views each illustrating a layout of a lens system included in a camera body according to the first to fifth exemplary embodiments.
Figure 2B:
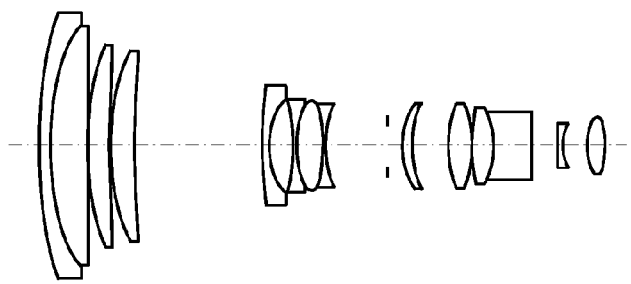
Figure 2C:
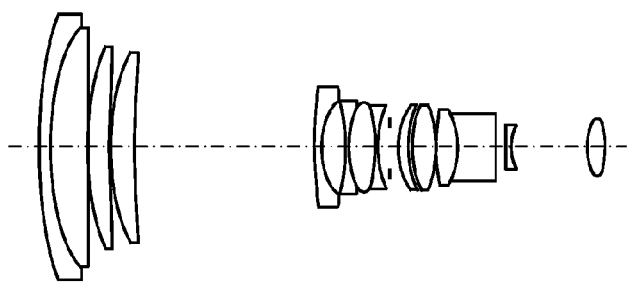

The lens system included in camera body 200 according to the first exemplary embodiment is hereinafter described. FIGS. 2A to 2C each illustrate a layout of the lens system in an infinity focusing state according to the first exemplary embodiment. A lens system identical to the lens system illustrated in FIG. 2 is included in each of camera bodies 200 according to second through fifth exemplary embodiments.

FIG. 2A illustrates a lens structure at a wide end, FIG. 2B illustrates a lens structure at an intermediate position, and FIG. 2C illustrates a lens structure at a tele end. The wide end illustrated in FIG. 2A corresponds to a shortest focal distance state. A focal distance in the shortest focal distance state is $f_w$. The intermediate position illustrated in FIG. 2B refers to an intermediate focal distance state. A focal distance $f_M$ in the intermediate focal distance state is specified by a following equation.

$$f_M = \sqrt{f_W * f_T}$$ [Equation 1]

The tele end illustrated in FIG. 2C corresponds to a longest focal distance state. A focal distance in the longest focal distance state is $f_T$. In the respective parts of the figure illustrating the layout, polygonal-line arrows shown in FIG. 2A are lines each of which connects positions of a corresponding lens group in the states of the wide end, intermediate position, and tele end in this order from above. Connections between the wide end and the intermediate position, and between the intermediate position and the tele end are indicated only by lines not representing actual movements of the lens groups.

The arrows given to the lens groups indicate focusing from an infinity focusing state to a close object focusing state. More specifically, FIGS. 2A to 2C each illustrate directions of movements at the time of focusing of fifth lens group G5 (described below) from the infinity focusing state to the close object focusing state. An arrow indicating focusing below a reference number of fifth lens group G5 is given only for convenience of explanation with reference to FIG. 2A showing reference numbers of respective lens groups. The directions of movements of fifth lens group G5 at the time of focusing in respective zooming states are specifically described below.

The lens system includes first lens group G1 having positive power, second lens group G2 having negative power, third lens group G3 having an aperture stop and positive power, fourth lens group G4 having positive power, fifth lens group G5 having negative power, and sixth lens group G6 having positive power.

At the time of zooming from the wide end to the tele end, the respective lens groups of the lens system move in a direction along an optical axis such that each of distances between the respective lens groups, i.e., a distance between first lens group G1 and second lens group G2, a distance between second lens group G2 and third lens group G3, a distance between third lens group G3 and fourth lens group G4, a distance between fourth lens group G4 and fifth lens group G5, a distance between fifth lens group G5 and sixth lens group G6 can vary.

Asterisks "*" given to particular surfaces indicate that the particular surfaces are aspherical surfaces. Signs (+) and (−) given to respective lens groups correspond to signs of power of the respective lens groups. A line shown on the rightmost side indicates a position of image surface S.

As illustrated in FIG. 2A, first lens group G1 of the lens system includes first lens element L1 having a negative meniscus shape and directing a convex surface toward the object side, second lens element L2 having a positive meniscus shape and directing a convex surface toward the object side, third lens element L3 having a positive meniscus shape and directing a convex surface toward the object side, and fourth lens element L4 having a positive meniscus shape and directing a convex surface toward the object side in this order from the object side to the image side. First lens element L1 and second lens element L2 of these lens elements are joined to each other.

Second lens group G2 includes fifth lens element L5 having a negative meniscus shape and directing a convex surface toward the object side, sixth lens element L6 having a biconcave shape, seventh lens element L7 having a biconvex shape, and eighth lens element L8 having a biconcave shape in this order from the object side to the image side. An object side surface and an image side surface of sixth lens element L6 are aspherical surfaces.

Third lens group G3 includes aperture stop A, and ninth lens element L9 having a positive meniscus shape and directing a convex surface toward the object side in this order from the object side to the image side. An image side surface of ninth lens element L9 is an aspherical surface.

Fourth lens group G4 includes tenth lens element L10 having a biconvex shape, eleventh lens element L11 having a biconvex shape, and twelfth lens element L12 having a negative meniscus shape and directing a convex surface toward the image side in this order from the object side to the image side. Eleventh lens element L11 and twelfth lens element L12 of these lens elements are joined to each other. An object side surface and an image side surface of tenth lens element L10 are aspherical surfaces.

Fifth lens group G5 is only constituted by thirteenth lens element L13 having a biconcave shape.

Sixth lens group G6 is only constituted by fourteenth lens element L14 having a biconvex shape.

At the time of zooming from the wide end to the tele end for imaging, first lens group G1, aperture stop A and third lens group G3, and sixth lens group G6 do not shift. On the other hand, second lens group G2 monotonously shifts toward the image side, while fourth lens group G4 and fifth lens group G5 shift toward the object side. In other words, the respective lens groups shift along the optical axis at the time of zooming such that the distances between first lens group G1 and second lens group G2 and between fifth lens group G5 and sixth lens group G6 increase, that the distances between second lens group G2 and third lens group G3 and between third lens group G3 and fourth lens group G4 decrease, and that the distance between fourth lens group G4 and fifth lens group G5 varies.

At the time of focusing from the infinity focusing state to the close object focusing state, fifth lens group G5 corresponding to a focusing lens group shifts along the optical axis toward the image side in any zooming states.

1-1-3. Configuration of Correction Optical System

Figure 3A:
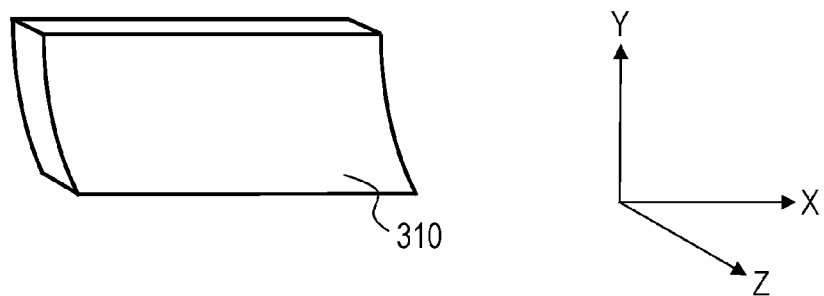
FIG. 3A is a perspective view of the correction optical system according to the first exemplary embodiment.
Figure 3B:
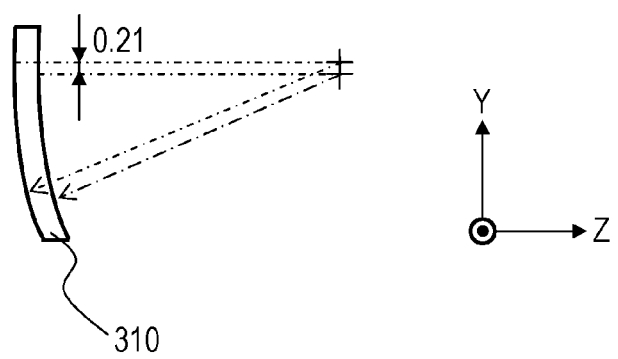
FIG. 3B is a view illustrating the correction optical system according to the first exemplary embodiment as viewed in a direction perpendicular to a Z axis.

FIGS. 3A and 3B are explanatory views of correction optical system 310 according to the first exemplary embodiment. FIG. 3A is a perspective view of correction optical system 310, while FIG. 3B is a view illustrating correction optical system 310 as viewed in a direction perpendicular to Y axis and Z axis. Correction optical system 310 according to the first exemplary embodiment is constituted by an optical device having a cylindrical shape. More specifically, correction optical system 310 has curvature only in the Y axis direction (vertex direction), while curvature of correction optical system 310 in an X-axis direction (perpendicular to vertex direction) is infinite. Accordingly, correction optical system 310 has such a shape that curvature in the X-axis direction and curvature in the Y-axis direction are different from each other. A surface of correction optical system 310 on the subject side of camera body 200 and a surface of correction optical system 310 on the image side of camera body 200 decenter from each other in the Y-axis direction as illustrated in FIG. 3B.

Correction optical system 310 according to the first exemplary embodiment includes light shielding portion 311 at a dome zenith side end (Y-axis direction) of a dome cover side surface of correction optical system 310. Light shielding portion 311 may be provided by printing. According to the first exemplary embodiment, however, light shielding portion 311 is constituted by a frame holding the optical device of correction optical system 310.

1-2. Operation

Figure 1B:
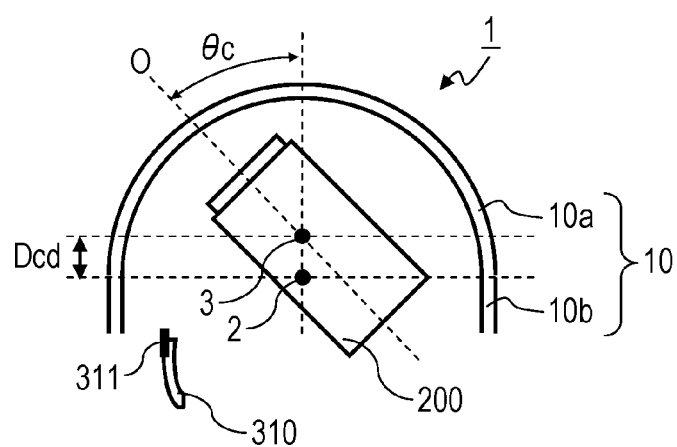
FIG. 1B is an explanatory view illustrating a relationship between operation of the camera body and operation of the correction optical system included in the dome camera according to the first exemplary embodiment in a state of oblique imaging.
Figure 1C:
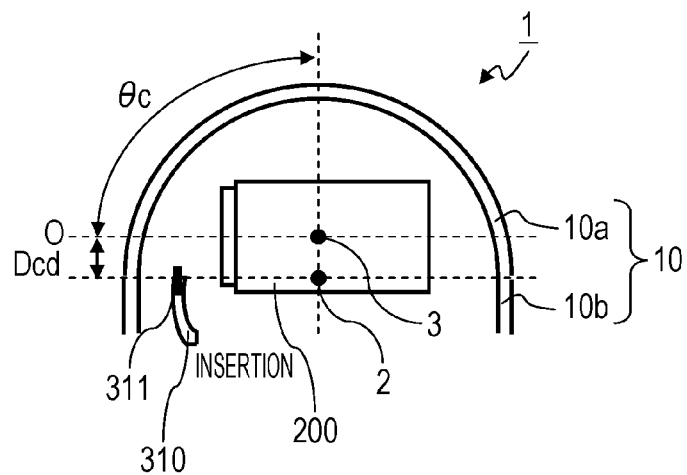
FIG. 1C is an explanatory view illustrating a relationship between operation of the camera body and operation of the correction optical system included in the dome camera according to the first exemplary embodiment in a state of horizontal imaging.
Figure 1D:
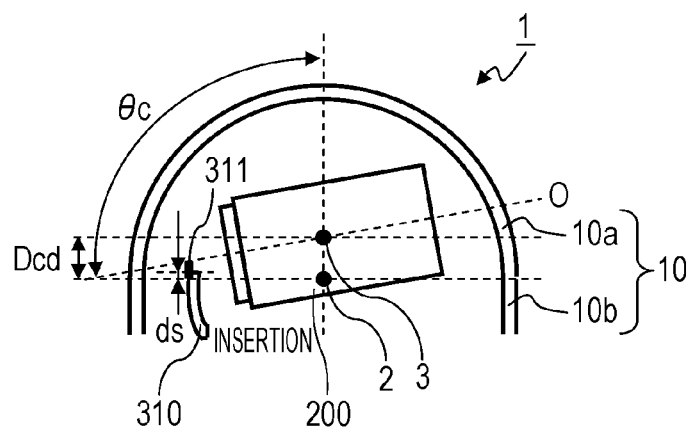
FIG. 1D is an explanatory view illustrating a relationship between operation of the camera body and operation of the correction optical system included in the dome camera according to the first exemplary embodiment in a state of oblique imaging in a direction opposite to a zenith.

FIGS. 1A to 1D are views schematically illustrating cross sections of dome camera 1 according to the first exemplary embodiment, presented as explanatory views of a relationship between camera body 200 and correction optical system 310. FIG. 1A illustrates an imaging state in a zenith direction of dome cover 10. FIG. 1B illustrates an oblique imaging state with rotation of camera body 200 by θc from the zenith direction imaging state illustrated in FIG. 1A. FIG. 1C illustrates a horizontal imaging state perpendicular to the zenith direction of dome cover 10. FIG. 1D illustrates an oblique imaging state in a direction opposite to the zenith, with rotation of camera body 200 by θc to shift from the horizontal imaging state illustrated in FIG. 1C toward the side opposite to the zenith. Camera body 200 rotates around a center axis corresponding to rotation center 3 of camera body 200. Rotation center 3 of camera body 200 is located at a position shifted toward the zenith of dome cover 10 from a spherical center position of dome cover 10 (curvature center 2 of spherical portion 10a).

Operation of dome camera 1 according to the first exemplary embodiment is hereinafter described with reference to FIGS. 1A to 1D.

In a range of the zooming position of the lens system from the wide end to the intermediate position, correction optical system 310 retracts to an outside of imaging range of camera body 200 regardless of rotation angle θc of camera body 200. On the other hand, in a range of the zooming position of the lens system from the intermediate position to the tele end, correction optical system 310 is inserted into the imaging range of camera body 200 in accordance with rotation angle θc of camera body 200.

More specifically, when rotation angle θc of camera body 200 lies in a range from 0° to 85°, correction optical system 310 retracts to the outside of the imaging range of camera body 200. When the angle of light ray of camera body 200 exceeds an angle for passing through cylindrical portion 10b, i.e., when rotation angle θc of camera body 200 exceeds 85°, correction optical system 310 is inserted into the imaging range of camera body 200.

When rotation angle θc of camera body 200 is 90° as illustrated in FIG. 1C, optical axis O of camera body 200 becomes parallel with a line connecting a boundary between cylindrical portion 10b and spherical portion 10a of dome cover 10 and a zenith side end of correction optical system 310. Assuming that the position of correction optical system 310 is 0 when θc is 90°, correction optical system 310 decenters toward the zenith of dome cover 10 in parallel with cylindrical portion 10b as θc increases to an angle larger than 90°. On the other hand, correction optical system 310 decenters in the direction opposite to the zenith of dome cover 10 as θc decreases to an angle smaller than 90°. In this case, correction optical system 310 decenters such that optical axis O of camera body 200 becomes parallel with the line connecting the boundary between cylindrical portion 10b and spherical portion 10a of dome cover 10 and the zenith side end of correction optical system 310. In other words, correction optical system 310 decenters in accordance with changes of θc such that optical axis O becomes parallel with the line connecting the boundary between cylindrical portion 10b and spherical portion 10a of dome cover 10 and the zenith side end of correction optical system 310. FIG. 1D illustrates decenter amount ds for decentering correction optical system 310.

1-3. Advantageous Effects and Others

According to dome camera 1 of the first exemplary embodiment, decenter coma aberration, one-sided blurring, astigmatism and other problems decrease even when camera body 200 images a subject in a direction of cylindrical portion 10b of dome cover 10. Accordingly, formation of high-quality images is realizable.

Advantageous effects of dome camera 1 according to the first exemplary embodiment are now described with reference to FIGS. 4A to 4D. FIGS. 4A and 4B are diagrams illustrating lateral aberration at the tele end in the horizontal imaging (θc=90°) when corrected by correction optical system 310, while FIGS. 4C and 4D illustrate lateral aberration at the tele end in the horizontal imaging (θc=90°)

when not corrected by correction optical system 310. FIGS. 4A and 4C are diagrams illustrating lateral aberration in a meridional direction, while FIGS. 4A and 4B illustrate lateral aberration in a sagittal direction. Solid lines indicate characteristics of d line (d-line), short broken lines indicate characteristics of F line (F-line), and long broken lines indicate characteristics of C line (C-line). In FIG. 4C, a tilt of an image surface is found on the pupil 1.0 side in −0.50 FA and 0.00 FA. However, in FIG. 4A, improvement of a tilt of an image surface is recognizable.

Curvature of cylindrical portion 10b of dome cover 10 in the X-axis direction (direction perpendicular to vertex direction) is different from curvature of cylindrical portion 10b in the Y-axis direction (vertex direction). Accordingly, the difference between the curvature in the X-axis direction and the curvature in the Y-axis direction is corrected by correction optical system 310 to equalize image formation positions passing cylindrical portion 10b in the X-axis direction and the Y-axis direction, and thus correct a tilt of an image surface of light ray passing through cylindrical portion 10b in the meridional direction. The pupil in the lateral aberration diagrams in FIGS. 4A to 4D is determined such that upper light ray, lower light ray, and main light ray at respective angles of view are positioned at 1, −1, and 0, respectively.

Second Exemplary Embodiment

A dome camera according to a second exemplary embodiment is hereinafter described with reference to FIGS. 5A to 5D and FIGS. 6A and 6B. In the second exemplary embodiment, configurations similar to the corresponding configurations of the first exemplary embodiment have been given similar reference numbers, and only different configurations are chiefly touched upon.

2-1-1. General Configuration

FIGS. 5A to 5D are views schematically illustrating cross sections of dome camera 1 according to the second exemplary embodiment, presented as explanatory views of a relationship between camera body 200 and correction optical system 320. A shape of correction optical system 320 of the second exemplary embodiment is different from the corresponding shape of the first exemplary embodiment. However, shapes of the lens system contained in camera body 200 and of dome cover 10 are similar to the corresponding shapes of the first exemplary embodiment.

2-1-2. Configuration of Correction Optical System

Figure 6A:
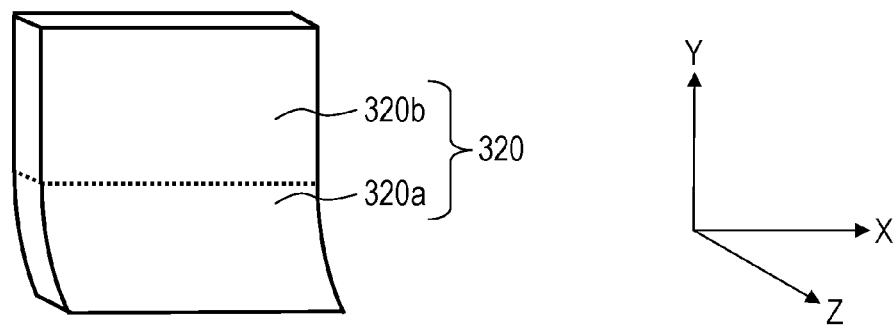
FIG. 6A is a perspective view of the correction optical system according to the second exemplary embodiment.
Figure 6B:
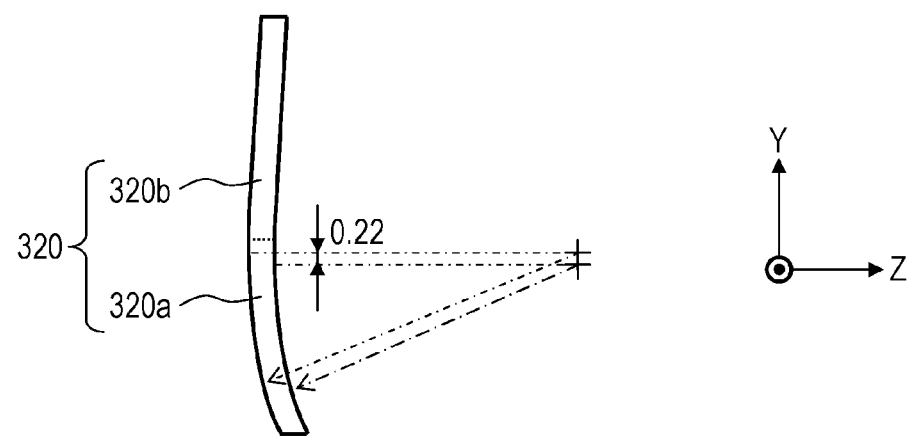
FIG. 6B is a view illustrating the correction optical system according to the second exemplary embodiment as viewed in a vertical direction along a Z axis.

FIGS. 6A and 6B are explanatory views of correction optical system 320 according to the second exemplary embodiment. FIG. 6A is a perspective view of correction optical system 320, while FIG. 6B is a view illustrating correction optical system 320 as viewed in a direction perpendicular to Y axis and Z axis. Correction optical system 320 according to the second exemplary embodiment is constituted by an optical device including curved portion 320a and flat portion 320b. Curved portion 320a has a cylindrical shape similarly to the first exemplary embodiment. Curved portion 320a has curvature only in the Y-axis direction (vertex direction), while curvature in an X-axis direction (direction perpendicular to vertex direction) is infinite. Accordingly, curvature of curved portion 320a in the X-axis direction is different from curvature of curved portion 320a in the Y-axis direction. A surface of curved portion 320a on the subject side of camera body 200 and a surface of curved portion 320a on the image surface side of camera body 200 decenter from each other in the Y direction illustrated in FIG. 6B. Curvature of flat portion 320b is infinite both in the X-axis direction and the Y-axis direction. Accordingly, flat portion 320b has a flat-plate shape.

2-2. Operation

Figure 5A:
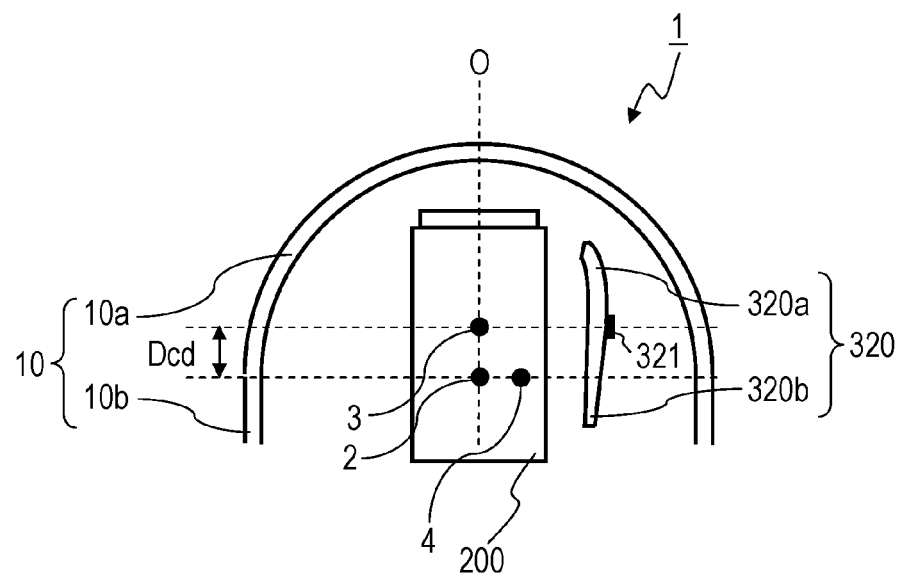
FIG. 5A is an explanatory view illustrating a relationship between operation of a camera body and operation of a correction optical system included in a dome camera according to a second exemplary embodiment in a state of zenith direction imaging.
Figure 5B:
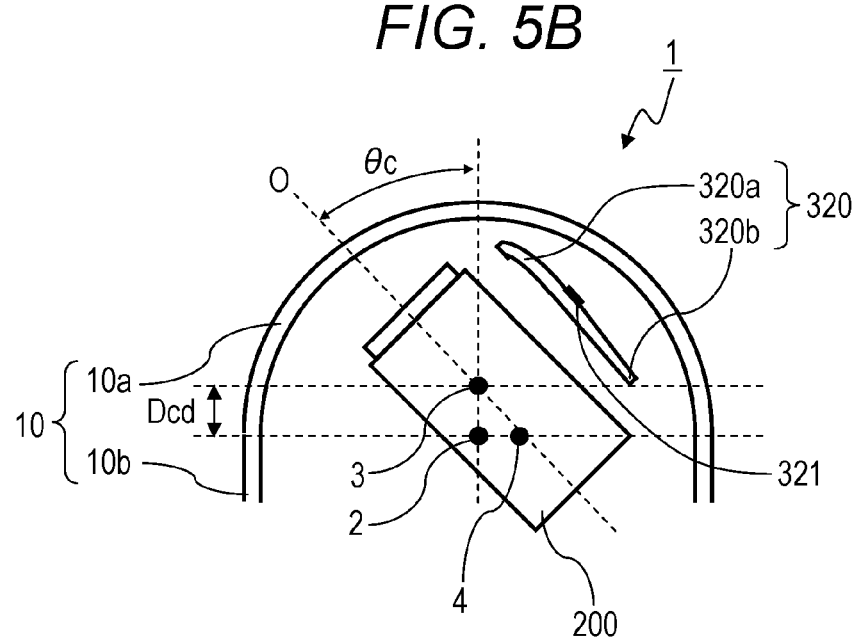
FIG. 5B is an explanatory view illustrating a relationship between operation of the camera body and operation of the correction optical system included in the dome camera according to the second exemplary embodiment in a state of oblique imaging.
Figure 5C:
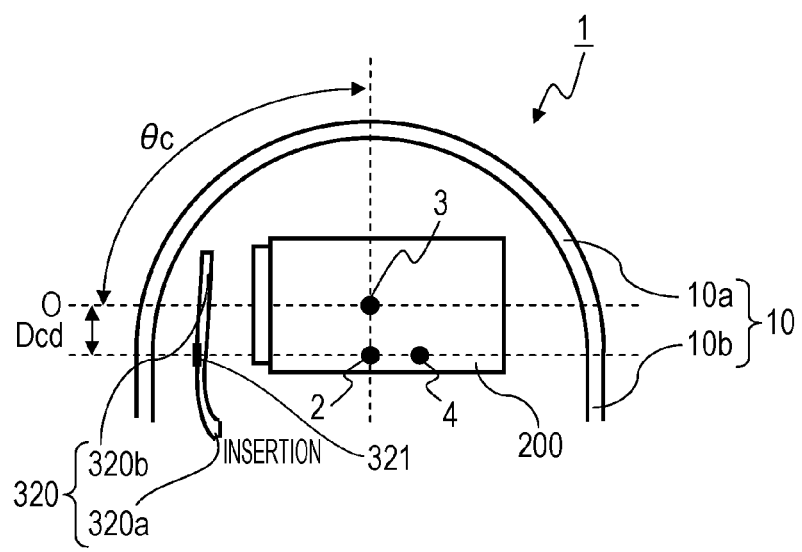
FIG. 5C is an explanatory view illustrating a relationship between operation of the camera body and operation of the correction optical system included in the dome camera according to the second exemplary embodiment in a state of horizontal imaging.
Figure 5D:
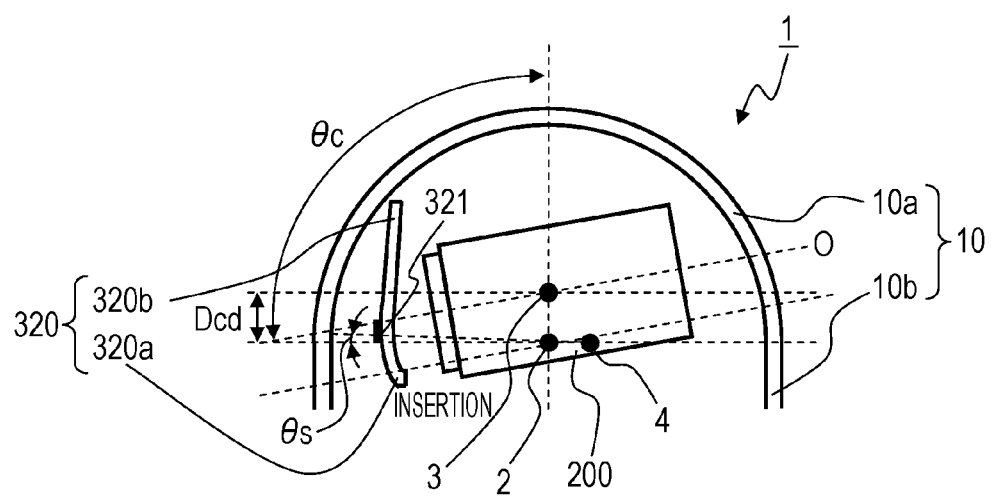
FIG. 5D is an explanatory view illustrating a relationship between operation of the camera body and operation of the correction optical system included in the dome camera according to the second exemplary embodiment in a state of oblique imaging in a direction opposite to a zenith.

FIG. 5A illustrates a zenith direction imaging state of dome cover 10. FIG. 5B illustrates an oblique imaging state with rotation of camera body 200 by θc from the zenith direction imaging state illustrated in FIG. 5A. FIG. 5C illustrates a horizontal imaging state perpendicular to the zenith direction of dome cover 10. FIG. 5D illustrates an oblique imaging state in a direction opposite to the zenith, with rotation of camera body 200 by θc to shift from the horizontal imaging state illustrated in FIG. 5C toward the side opposite to the zenith. Camera body 200 rotates around a center axis corresponding to rotation center 3 of camera body 200. Rotation center 3 of camera body 200 is located at a position shifted toward the zenith of dome cover 10 from a spherical center position of dome cover 10 (curvature center 2 of spherical portion 10a).

Operation of dome camera 1 according to the second exemplary embodiment is hereinafter described with reference to FIGS. 5A to 5D.

In a range of the zooming position of the lens system from the wide end to the intermediate position, correction optical system 320 retracts to an outside of an imaging range of camera body 200 regardless of rotation angle θc of camera body 200. On the other hand, in a range of the zooming position of the lens system from the intermediate position to the tele end, correction optical system 320 is inserted into the imaging range of camera body 200 by rotation around an axis of correction optical system rotation center 4 by rotation angle θs in accordance with rotation angle θc of camera body 200.

More specifically, when rotation angle θc of camera body 200 lies in a range from 0° to 85°, correction optical system 320 retracts to the outside of the imaging range of camera body 200. As illustrated in FIGS. 5A and 5B, correction optical system 320 retracts along the side of camera body 200 according to the second exemplary embodiment. When camera body 200 reaches a position where cylindrical portion 10b enters the angle of view of camera body 200, i.e., when rotation angle θc of camera body 200 exceeds 85°, correction optical system 320 is inserted into the imaging range of camera body 200.

When rotation angle θc of camera body 200 is 90° as illustrated in FIG. 5C, optical axis O of camera body 200 becomes parallel with a line connecting a boundary between cylindrical portion 10b and spherical portion 10a of dome cover 10 and a boundary between curved portion 320a and flat portion 320b of correction optical system 320. Assuming that the position of correction optical system 320 is 0 when θc is 90°, correction optical system 320 rotates toward the zenith of dome cover 10 as θc increases to an angle larger than 90°. On the other hand, correction optical system 320 rotates in the direction opposite to the zenith of dome cover 10 as θc decreases to an angle smaller than 90°. The rotation of correction optical system 320 in this context refers to rotation achieved when correction optical system rotation center 4 is located at a position apart from correction optical system 320. In this case, correction optical system 320 rotates such that optical axis O of camera body 200 becomes parallel with the line connecting the boundary between cylindrical portion 10b and spherical portion 10a of dome cover 10 and the boundary between curved portion 320a and flat portion 320b of correction optical system 320. In other words, correction optical system 320 rotates in accordance with changes of θc such that optical axis O becomes parallel with the line connecting the boundary between cylindrical portion 10b and spherical portion 10a of dome cover 10 and the boundary between curved portion 320a and flat portion 320b of correction optical system 320.

2-3. Advantageous Effects and Others

According to dome camera 1 of the second exemplary embodiment, decenter coma aberration and astigmatism decrease even when camera body 200 images a subject in a direction of cylindrical portion 10b of dome cover 10. In addition, formation of high-quality images is realizable while reducing lowering of a light amount.

Figure 7A:
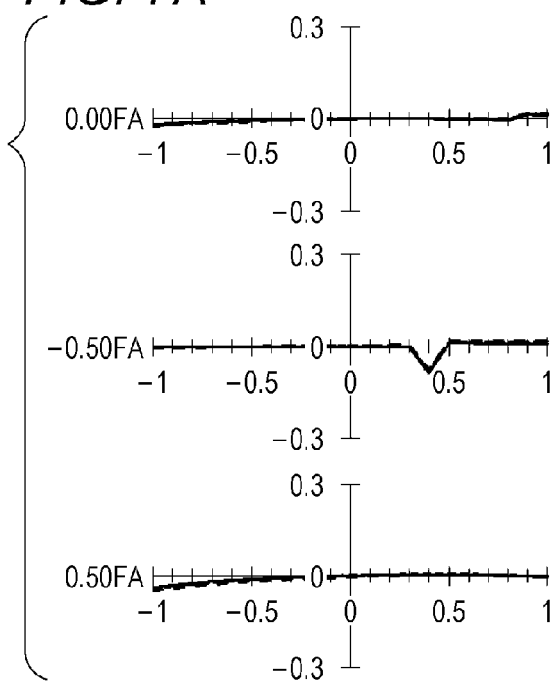
FIGS. 7A to 7D each illustrate lateral aberration at a tele end of the dome camera according to the second exemplary embodiment in a state corrected by the correction optical system and in a state not corrected by the correction optical system.
Figure 7B:
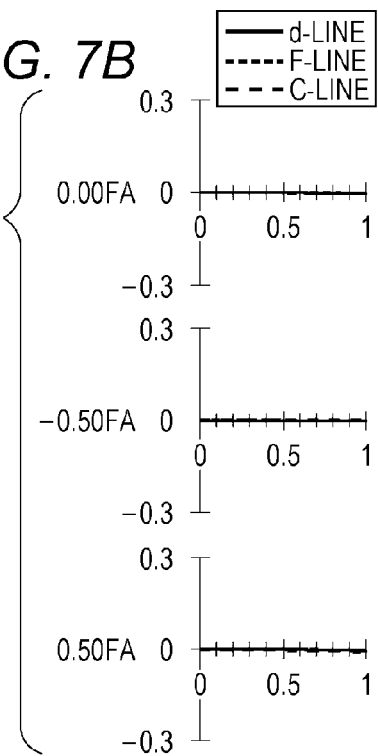
Figure 7C:
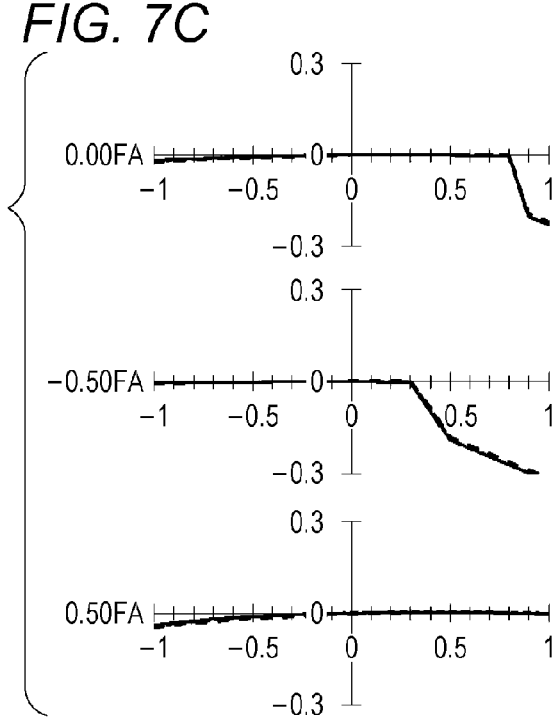
Figure 7D:
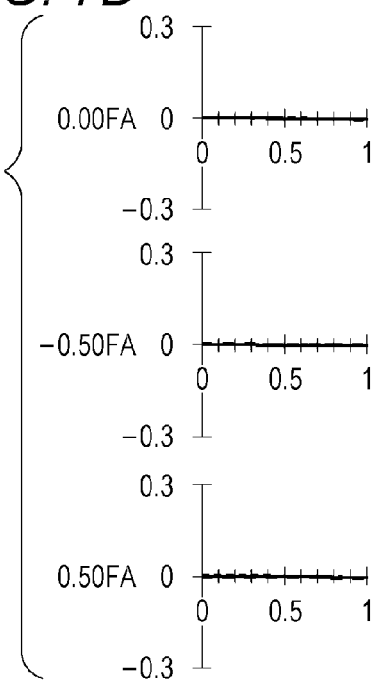

Advantageous effects of dome camera 1 according to the second exemplary embodiment are now described with reference to FIGS. 7A to 7D. FIGS. 7A and 7B are diagrams illustrating lateral aberration at the tele end in the horizontal imaging (θc=90°) when corrected by correction optical system 320, while FIGS. 7C and 7D illustrate lateral aberration at the tele end in the horizontal imaging (θc=90°) when not corrected by correction optical system 320. FIGS. 7A and 7C are diagrams illustrating lateral aberration in a meridional direction, while FIGS. 7B and 7D illustrate lateral aberration in a sagittal direction. Solid lines indicate characteristics of d line (d-line), short broken lines indicate characteristics of F line (F-line), and long broken lines indicate characteristics of C line (C-line). In FIG. 7C, a tilt of an image surface is found on the pupil 1.0 side in −0.50 FA and 0.00 FA. However, in FIG. 7A, improvement of a tilt of an image surface is recognizable.

Curvature of cylindrical portion 10b of dome cover 10 in the X-axis direction (direction perpendicular to vertex direction) is different from curvature of cylindrical portion 10b in the Y-axis direction (vertex direction). Accordingly, the difference between the curvature in the X-axis direction and the curvature in the Y-axis direction is corrected by correction optical system 320 to equalize image formation positions passing cylindrical portion 10b in the X-axis direction and the Y-axis direction, and thus correct a tilt of an image surface of light ray passing through cylindrical portion 10b in the meridional direction. Protrusion of lateral aberration in the meridional direction at the pupil 0.4 in −0.50 FA in FIG. 7A is caused by a ghost in the vicinity of the boundary between curved portion 320a and flat portion 320b of correction optical system 320. This ghost decreases when light shielding portion 321 is provided on correction optical system 320. According to the second exemplary embodiment, light shielding portion 321 is disposed on a dome cover side surface of correction optical system 320.

Third Exemplary Embodiment

3-1. Configuration

FIGS. 8A to 8D are views schematically illustrating cross sections of dome camera 1 according to a third exemplary embodiment, presented as explanatory views of a relationship between camera body 200 and correction optical system 330. Dome camera 1 according to the third exemplary embodiment includes camera body 200, dome cover 10, and correction optical system 330. Correction optical system 330 is a decenter correction optical system constituted by one optical device.

Camera body 200 disposed inside dome cover 10 contains a lens system and an imaging device. The lens system is a zoom lens system configured similarly to the first exemplary embodiment.

Dome cover 10 has a substantially semispherical shape. A radius of curvature of an outside (front surface) of the dome cover is different from a radius of curvature of an inside (rear surface) of the dome cover. A front surface and a rear surface of dome cover 10 are both constituted by spherical surfaces. It is advantageous that a thickness of dome cover 10 is the smallest in a zenith portion of dome cover 10, and increases in a direction away from the zenith portion. This structure corrects aberration generated by deviation between dome cover 10 and optical axis O in a separation state of curvature center 2 of dome cover 10 from rotation center 3 of camera body 200 in accordance with a tilt of camera body 200.

Correction optical system 330 optically corrects light ray passing through dome cover 10. Correction optical system 330 decenters perpendicularly to the optical axis in accordance with rotation angle θc of camera body 200. Operation of correction optical system 330 is detailed below. Correction optical system 330 according to the third exemplary embodiment has positive power and a meniscus shape.

3-2. Operation

Figure 8A:
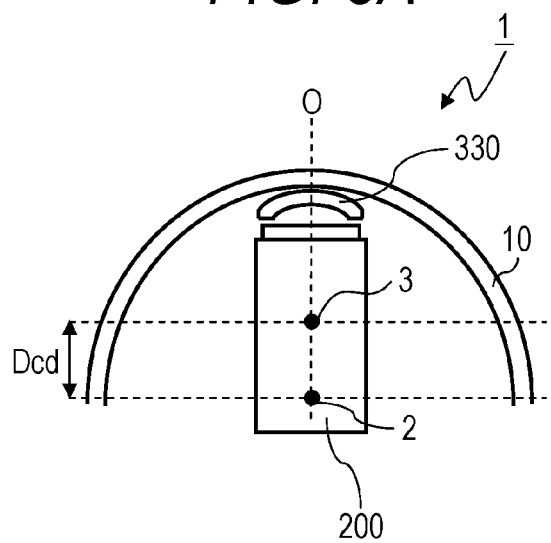
FIG. 8A is an explanatory view illustrating a relationship between operation of a camera body and operation of a correction optical system included in a dome camera according to a third exemplary embodiment in a state of zenith direction imaging.
Figure 8B:
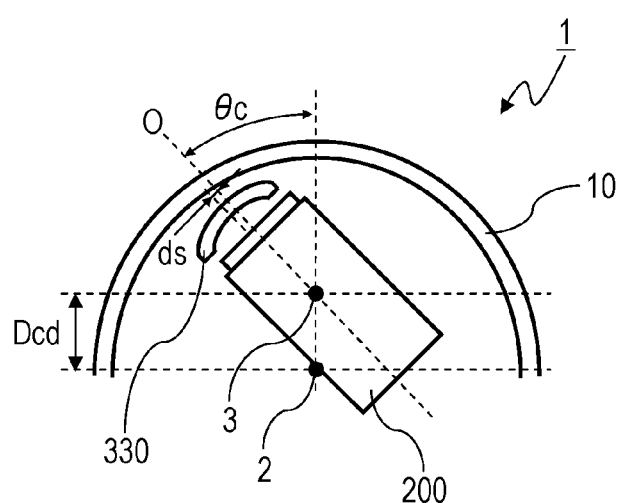
FIG. 8B is an explanatory view illustrating a relationship between operation of the camera body and operation of the correction optical system included in the dome camera according to the third exemplary embodiment in a state of oblique imaging.
Figure 8C:
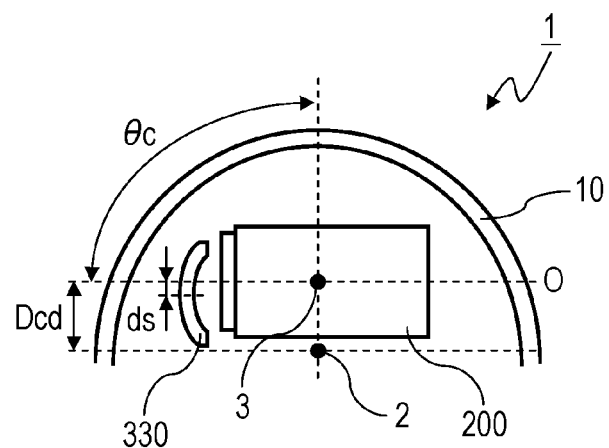
FIG. 8C is an explanatory view illustrating a relationship between operation of the camera body and operation of the correction optical system included in the dome camera according to the third exemplary embodiment in a state of horizontal imaging.
Figure 8D:
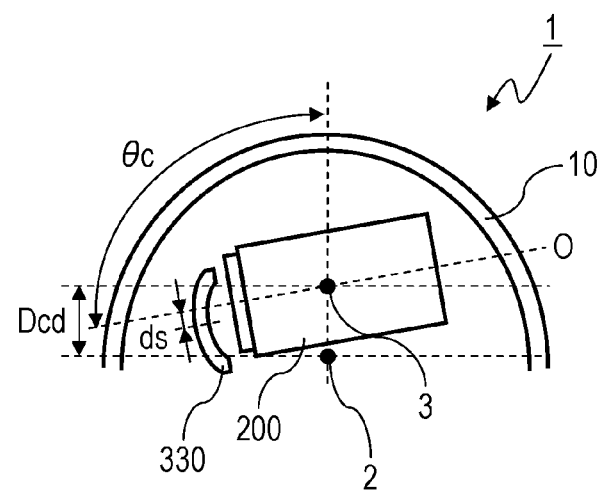
FIG. 8D is an explanatory view illustrating a relationship between operation of the camera body and operation of the correction optical system included in the dome camera according to the third exemplary embodiment in a state of oblique imaging in a direction opposite to a zenith.

FIG. 8A illustrates a zenith direction imaging state of dome cover 10. FIG. 8B illustrates an oblique imaging state with rotation of camera body 200 by θc from the zenith direction imaging state illustrated in FIG. 8A. FIG. 8C illustrates a horizontal imaging state perpendicular to the zenith direction of dome cover 10. FIG. 8D illustrates an oblique imaging state in a direction opposite to the zenith, with rotation of camera body 200 by θc to shift from the horizontal imaging state illustrated in FIG. 8C toward the side opposite to the zenith. Camera body 200 rotates around a center axis corresponding to rotation center 3 of camera body 200. Rotation center 3 of camera body 200 is located at a position shifted toward the zenith of dome cover 10 from a spherical center position (curvature center 2) of dome cover 10.

Operation of dome camera 1 according to the third exemplary embodiment is hereinafter described with reference to FIGS. 8A to 8D.

In a range of the zooming position of the lens system from the wide end to the intermediate position, optical axis O of camera body 200 passes through the center of correction optical system 330 as illustrated in FIG. 8A. In this case, correction optical system 330 does not decenter.

On the other hand, in a range of the zooming position of the lens system from the intermediate position to the tele end, correction optical system 330 operates as follows. In a state that camera body 200 performs imaging in the zenith direction of dome cover 10 as illustrated in FIG. 8A, the center of correction optical system 330 is located on optical axis O. As camera body 200 tilts toward the horizontal direction from the state illustrated in FIG. 8A, correction optical system 330 decenters perpendicularly to optical axis O in a direction opposite to the zenith of dome cover 10. An absolute value of decenter amount ds of correction optical system 330 becomes the maximum when rotation angle θc of camera body 200 is 90°. After θc exceeds 90° as illustrated in FIG. 8D, the absolute value of decenter amount ds of correction optical system 330 decreases.

3-3. Advantageous Effects and Others

According to dome camera 1 of the third exemplary embodiment, aberration generated as a result of decenter between dome cover 10 and optical axis O of camera body 200 is appropriately correctable.

Advantageous effects of dome camera 1 according to the third exemplary embodiment are now described with reference to FIGS. 9A to 9D. FIGS. 9A and 9B are diagrams illustrating lateral aberration at the tele end in the horizontal imaging (θc=90°) when corrected by correction optical system 330, while FIGS. 9C and 9D illustrate lateral aberration at the tele end in the horizontal imaging (θc=90°) when not corrected by correction optical system 330. FIGS. 9A and 9C are diagrams illustrating lateral aberration in a meridional direction, while FIGS. 9B and 9D illustrate lateral aberration in a sagittal direction. Solid lines indicate characteristics of d line (d-line), short broken lines indicate characteristics of F line (F-line), and long broken lines indicate characteristics of C line (C-line). Respective aberrations recognized in FIGS. 9C and 9D are improved in FIGS. 9A and 9B. Based on these results, it is considered that particularly coma aberration is improved by decenter of correction optical system 330.

Fourth Exemplary Embodiment

4-1. Configuration

FIGS. 10A through 10D are views schematically illustrating cross sections of dome camera 1 according to a fourth exemplary embodiment, presented as explanatory views of a relationship between camera body 200 and correction optical system 340. Dome camera 1 according to the fourth exemplary embodiment includes camera body 200, dome cover 10, and correction optical system 340. Correction optical system 340 includes movable correction optical system 340a, and fixed correction optical system 340b disposed next to camera body 200 side of movable correction optical system 340a.

Camera body 200 disposed inside dome cover 10 contains a lens system and an imaging device. The lens system is a zoom lens system configured similarly to the first exemplary embodiment. Dome cover 10 has a substantially semispherical shape.

Movable correction optical system 340a rotates around an axis of correction optical system rotation center 4 in accordance with rotation angle θc of camera body 200. Operation of movable correction optical system 340a is detailed below. Movable correction optical system 340a according to the fourth exemplary embodiment has negative power and a meniscus shape. Fixed correction optical system 340b has positive power and a meniscus shape.

4-2. Operation

Figure 10A:
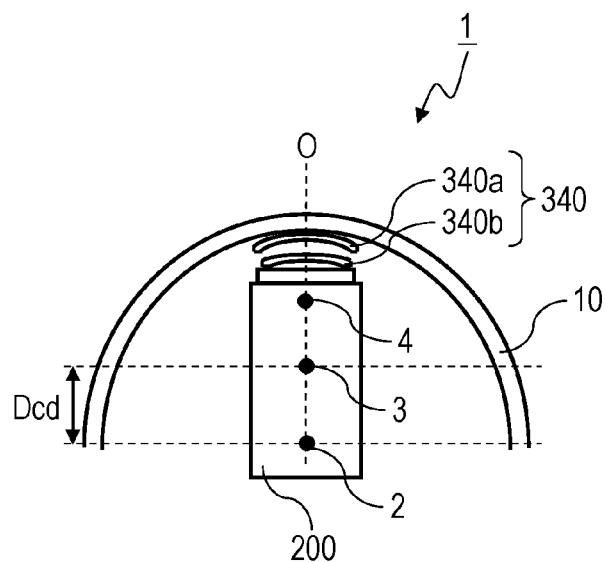
FIG. 10A is an explanatory view illustrating a relationship between operation of a camera body and operation of a correction optical system included in a dome camera according to a fourth exemplary embodiment in a state of zenith direction imaging.
Figure 10B:
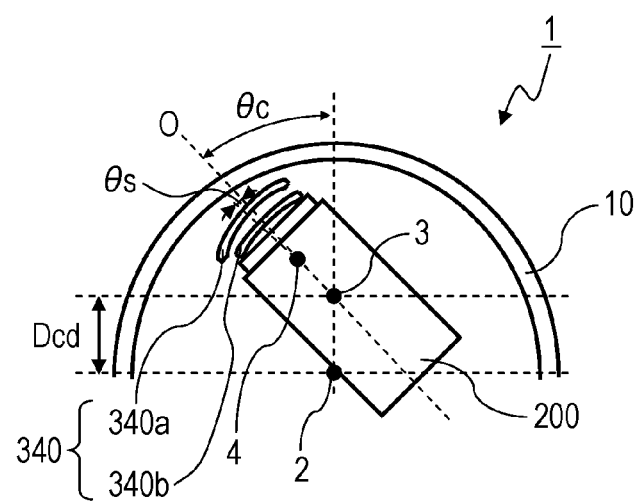
FIG. 10B is an explanatory view illustrating a relationship between operation of the camera body and operation of the correction optical system included in the dome camera according to the fourth exemplary embodiment in a state of oblique imaging.
Figure 10C:
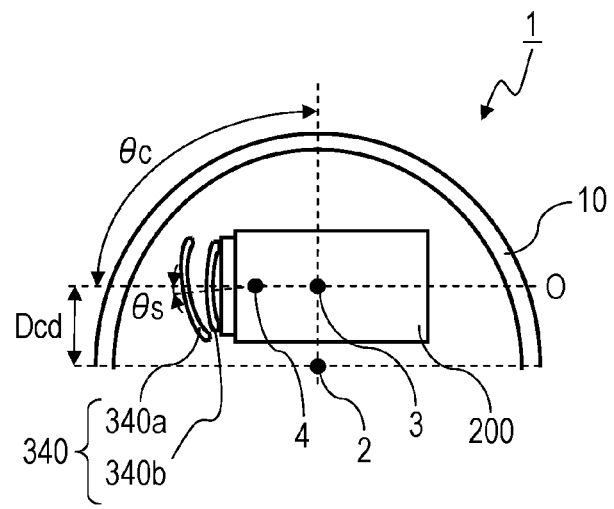
FIG. 10C is an explanatory view illustrating a relationship between operation of the camera body and operation of the correction optical system included in the dome camera according to the fourth exemplary embodiment in a state of horizontal imaging.
Figure 10D:
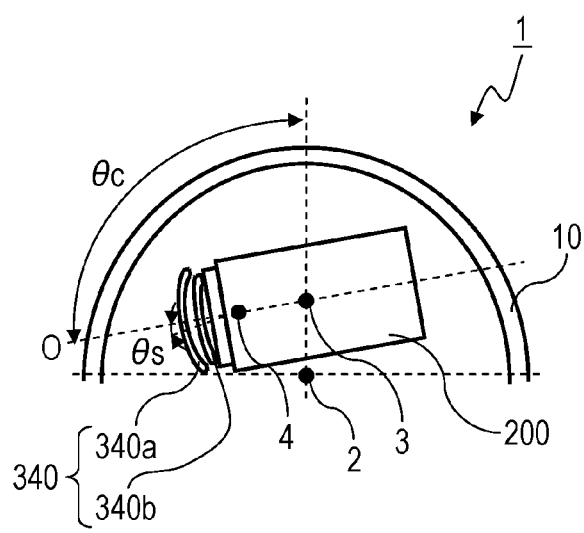
FIG. 10D is an explanatory view illustrating a relationship between operation of the camera body and operation of the correction optical system included in the dome camera according to the fourth exemplary embodiment in a state of oblique imaging in a direction opposite to a zenith.

FIG. 10A illustrates a zenith direction imaging state of dome cover 10. FIG. 10B illustrates an oblique imaging state with rotation of camera body 200 by θc from the zenith direction imaging state illustrated in FIG. 10A. FIG. 10C illustrates a horizontal imaging state perpendicular to the zenith direction of dome cover 10. FIG. 10D illustrates an oblique imaging state in a direction opposite to the zenith, with rotation of camera body 200 by θc to shift from the horizontal imaging state illustrated in FIG. 10C toward the side opposite to the zenith. Camera body 200 rotates around a center axis corresponding to rotation center 3 of camera body 200. Rotation center 3 of camera body 200 is located at a position shifted toward the zenith of dome cover 10 from a spherical center position (curvature center 2) of dome cover 10.

Operation of dome camera 1 according to the fourth exemplary embodiment is hereinafter described with reference to FIGS. 10A to 10D.

In a range of the zooming position of the lens system from the wide end to the intermediate position, correction optical system rotation center 4 passes through optical axis O of camera body 200 as illustrated in FIG. 10A.

On the other hand, in a range of the zooming position of the lens system from the intermediate position to the tele end, correction optical system 340 operates as follows. In a state that camera body 200 performs imaging in the zenith direction of dome cover 10 as illustrated in FIG. 10A, correction optical system rotation center 4 is located on optical axis O. In this case, movable correction optical system 340a does not rotate. As camera body 200 tilts toward the horizontal direction from the state illustrated in FIG. 10A, movable correction optical system 340a rotates around correction optical system rotation center 4 in a direction opposite to the zenith of dome cover 10. Rotation angle θs of movable correction optical system 340a is 0° when the imaging direction of camera body 200 is the zenith direction. Rotation angle θs of movable correction optical system 340a increases as rotation angle θc of camera body 200 increases. The value of θs becomes the maximum when θc is 90°. When θc exceeds 90° as illustrated in FIG. 10D, θs decreases.

4-3. Advantageous Effects and Others

According to dome camera 1 of the fourth exemplary embodiment, aberration generated as a result of decenter between dome cover 10 and optical axis O of camera body 200 is appropriately correctable.

Figure 11A:
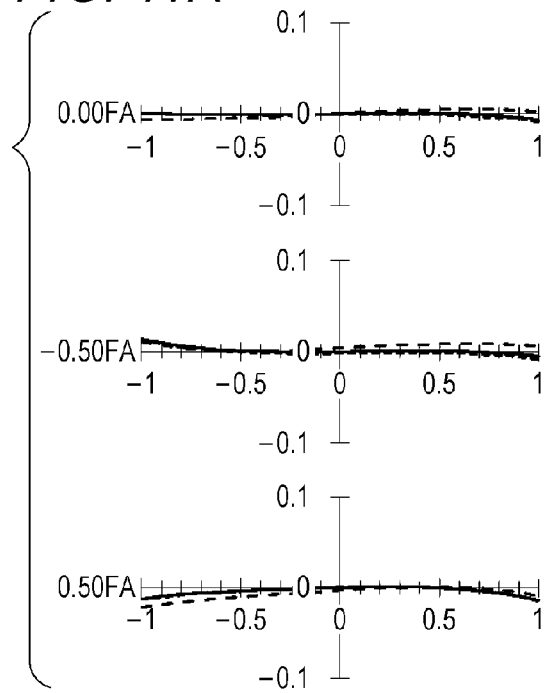
FIGS. 11A to 11D each illustrate lateral aberration at a tele end of the dome camera according to the fourth exemplary embodiment in a state corrected by the correction optical system and in a state not corrected by the correction optical system.
Figure 11B:
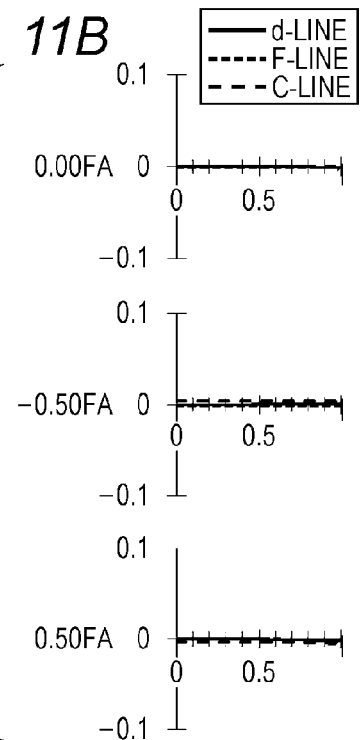
Figure 11C:
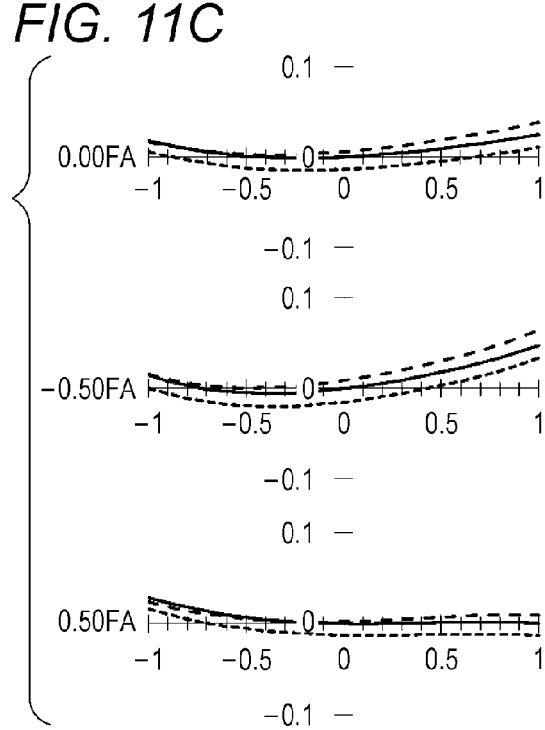
Figure 11D:
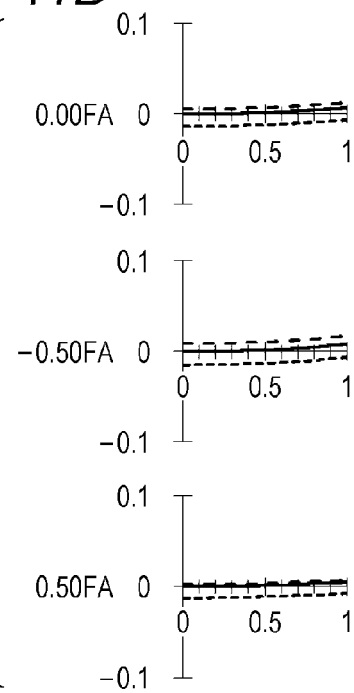

Advantageous effects of dome camera 1 according to the fourth exemplary embodiment are now described with reference to FIGS. 11A to 11D. FIGS. 11A and 11B are diagrams illustrating lateral aberration at the tele end in the horizontal imaging (θc=90°) when corrected by correction optical system 340, while FIGS. 11C and 11D illustrate lateral aberration at the tele end in the horizontal imaging (θc=90°) when not corrected by correction optical system 340. FIGS. 11A and 11C are diagrams illustrating lateral aberration in a meridional direction, while FIGS. 11B and 11D illustrate lateral aberration in a sagittal direction. Solid lines indicate characteristics of d line (d-line), short broken lines indicate characteristics of F line (F-line), and long broken lines indicate characteristics of C line (C-line). Respective aberrations recognized in FIGS. 11C and 11D are improved in FIGS. 11A and 11B. Based on these results, it is considered that particularly coma aberration and chromatic aberration are improved by rotation of movable correction optical system 340a.

Fifth Exemplary Embodiment

5-1. Configuration

FIGS. 12A to 12D are views schematically illustrating cross sections of dome camera 1 according to a fifth exemplary embodiment, presented as explanatory views of a relationship between camera body 200 and correction optical system 350. Dome camera 1 according to the fifth exemplary embodiment includes camera body 200, dome cover 10, and correction optical system 350. Correction optical system 350 includes movable correction optical system 350a, and fixed correction optical system 350b disposed next to camera body 200 side of movable correction optical system 350a.

Camera body 200 disposed inside dome cover 10 contains a lens system and an imaging device. The lens system is a zoom lens system configured similarly to the first exemplary embodiment. Dome cover 10 has a substantially semispherical shape.

Movable correction optical system 350a rotates around an axis of correction optical system rotation center 5, and decenters in accordance with rotation angle θc of camera body 200. Operation of movable correction optical system 350a is detailed below. Movable correction optical system 350a according to the fifth exemplary embodiment has positive power and a meniscus shape. Fixed correction optical system 350b has negative power and a meniscus shape.

5-2. Operation

Figure 12A:
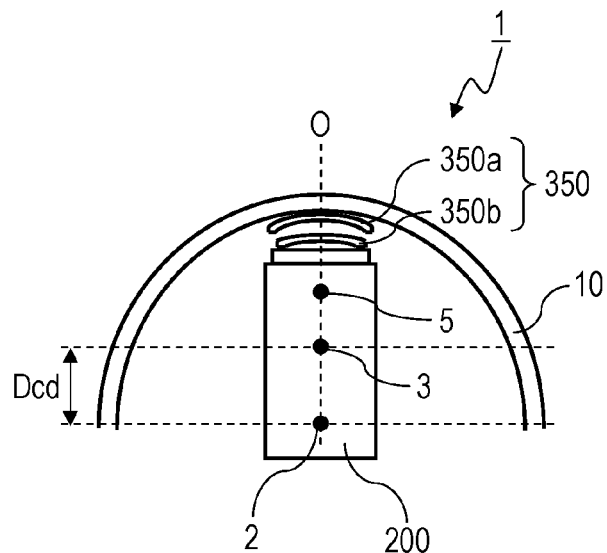
FIG. 12A is an explanatory view illustrating a relationship between operation of a camera body and operation of a correction optical system included in a dome camera according to a fifth exemplary embodiment in a state of zenith direction imaging.
Figure 12B:
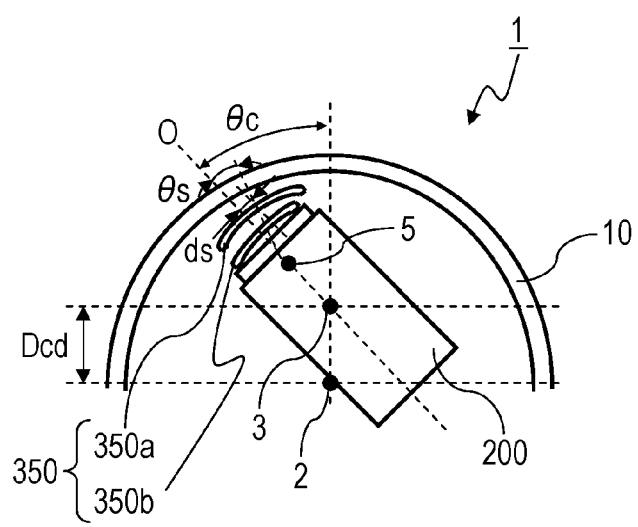
FIG. 12B is an explanatory view illustrating a relationship between operation of the camera body and operation of the correction optical system included in the dome camera according to the fifth exemplary embodiment in a state of oblique imaging.
Figure 12C:
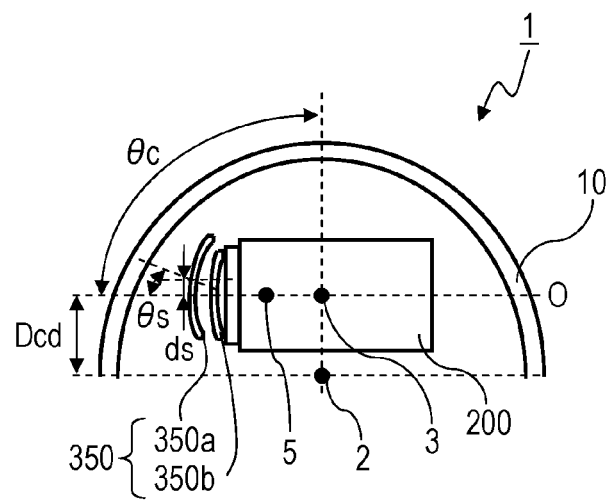
FIG. 12C is an explanatory view illustrating a relationship between operation of the camera body and operation of the correction optical system included in the dome camera according to the fifth exemplary embodiment in a state of horizontal imaging.
Figure 12D:
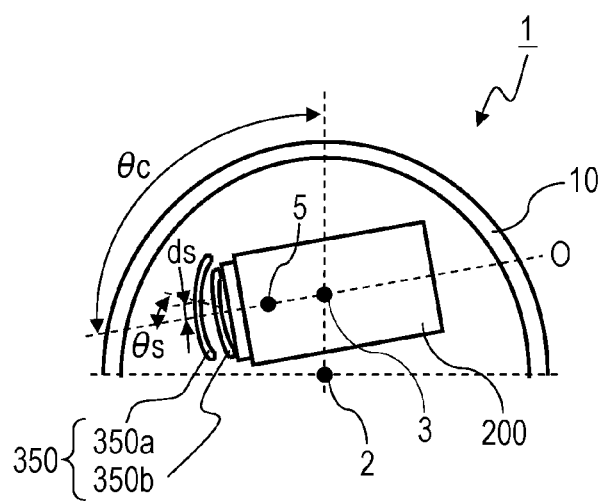
FIG. 12D is an explanatory view illustrating a relationship between operation of the camera body and operation of the correction optical system included in the dome camera according to the fifth exemplary embodiment in a state of oblique imaging in a direction opposite to a zenith.

FIG. 12A illustrates a zenith direction imaging state of dome cover 10. FIG. 12B illustrates an oblique imaging state with rotation of camera body 200 by θc from the zenith direction imaging state illustrated in FIG. 12A. FIG. 12C illustrates a horizontal imaging state perpendicular to the zenith direction of dome cover 10. FIG. 12D illustrates an oblique imaging state in a direction opposite to the zenith, with rotation of camera body 200 by θc to shift from the horizontal imaging state illustrated in FIG. 12C toward the side opposite to the zenith. Camera body 200 rotates around a center axis corresponding to rotation center 3 of camera body 200. Rotation center 3 of camera body 200 is located at a position shifted toward the zenith of dome cover 10 from a spherical center position (curvature center 2) of dome cover 10.

Operation of dome camera 1 according to the fifth exemplary embodiment is hereinafter described with reference to FIGS. 12A to 12D.

In a range of the zooming position of the lens system from the wide end to the intermediate position, correction optical system rotation center 5 is located on optical axis O of camera body 200 regardless of rotation angle θc of camera body 200. Accordingly, movable correction optical system 350a does not rotate nor decenter.

On the other hand, in a range of the zooming position of the lens system from the intermediate position to the tele end, correction optical system 350 operates as follows. In a state that camera body 200 performs imaging in the zenith direction of dome cover 10 as illustrated in FIG. 12A, correction optical system rotation center 5 is located on optical axis O. In this case, movable correction optical system 350a does not rotate nor decenter. As camera body 200 tilts toward the horizontal direction from the state illustrated in FIG. 12A, i.e., when rotation angle θc of camera body 200 increases, movable correction optical system 350a rotates by an amount of rotation angle θs around correction optical system rotation center 5 in a direction toward the zenith of dome cover 10. In addition, movable correction optical system 350a decenters by decenter amount ds perpendicularly to optical axis O in a direction opposite to the zenith. The value of θs becomes the maximum when θc is 90°. The value of rotation angle θs decreases after θc exceeds 90°. On the other hand, ds changes in proportion to the value of θc.

5-3. Advantageous Effects and Others

According to dome camera 1 of the fifth exemplary embodiment, aberration generated as a result of decenter between dome cover 10 and optical axis O of camera body 200 is appropriately correctable.

Figure 13A:
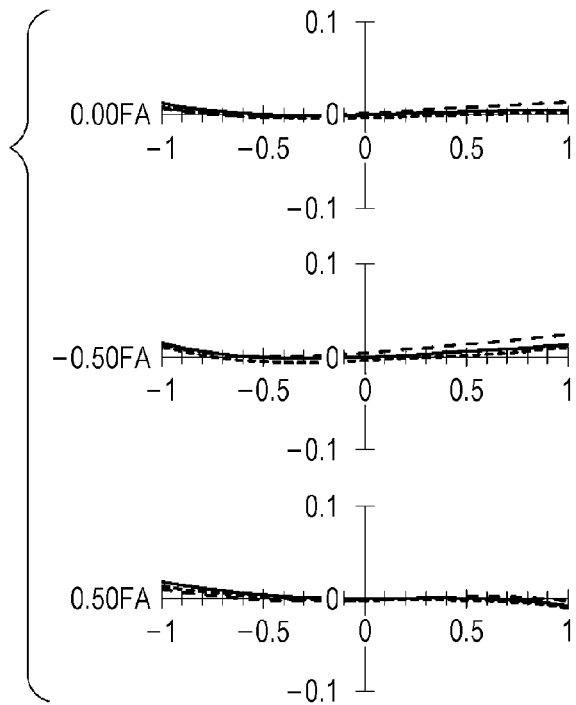
FIGS. 13A to 13D each illustrate lateral aberration at a tele end of the dome camera according to the fifth exemplary embodiment in a state corrected by the correction optical system and in a state not corrected by the correction optical system.
Figure 13B:
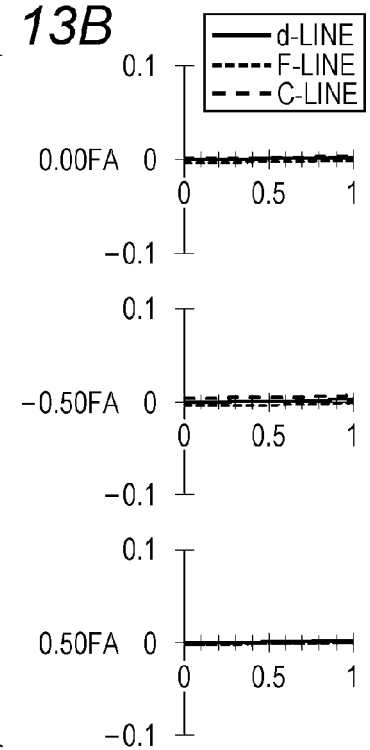
Figure 13C:
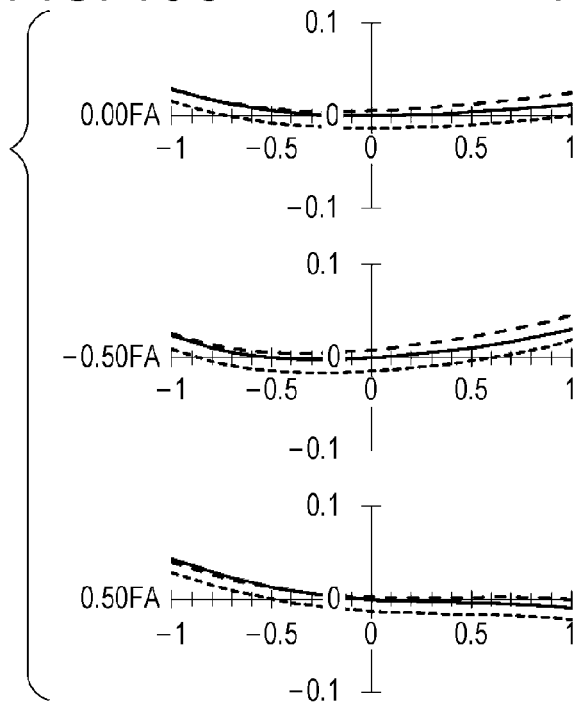
Figure 13D:
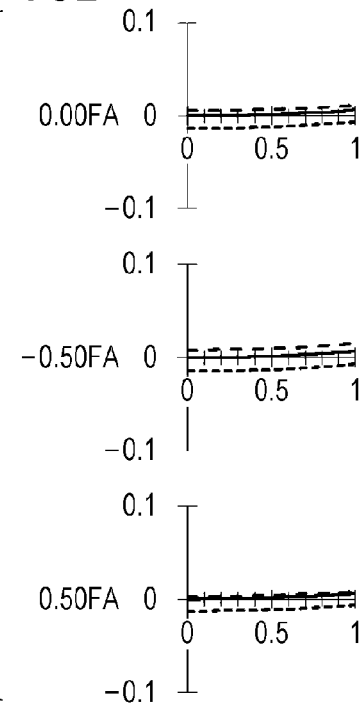

Advantageous effects of dome camera 1 according to the fifth exemplary embodiment are now described with reference to FIGS. 13A to 13D. FIGS. 13A and 13B are diagrams illustrating lateral aberration at the tele end in the horizontal imaging (θc=90°) when corrected by correction optical system 350, while FIGS. 13C and 13D illustrate lateral aberration at the tele end in the horizontal imaging (θc=90°) when not corrected by correction optical system 350. FIGS. 13A and 13C are diagrams illustrating lateral aberration in a meridional direction, while FIGS. 13B and 13D illustrate lateral aberration in a sagittal direction. Solid lines indicate characteristics of d line (d-line), short broken lines indicate characteristics of F line (F-line), and long broken lines indicate characteristics of C line (C-line). Respective aberrations recognized in FIGS. 13C and 13D are improved in FIGS. 13A and 13B. Based on these results, it is considered that particularly coma aberration and chromatic aberration are improved by rotation and decenter of movable correction optical system 350a.

Sixth Exemplary Embodiment

6-1. Configuration

6-1-1. General Configuration

A general configuration of a dome camera according to a sixth exemplary embodiment is hereinafter described with reference to FIGS. 14A to 14D. Dome camera 1 according to the sixth exemplary embodiment includes camera body 200 and dome cover 10.

Camera body 200 disposed inside dome cover 10 contains a lens system and an imaging device. According to dome camera 1 of the sixth exemplary embodiment, the lens system is a zoom lens system, while dome cover 10 has a substantially semispherical shape.

Dome camera 1 includes a pan motor (not shown) and a tilt motor (not shown). Camera body 200 is rotatable in a pan direction and a tilt direction with respect to dome cover 10 by rotations of the pan motor and the tilt motor. Operations of the pan motor and the tilt motor are controlled by a controller such as a microcomputer.

6-1-2. Lens Configuration

Figure 15A:
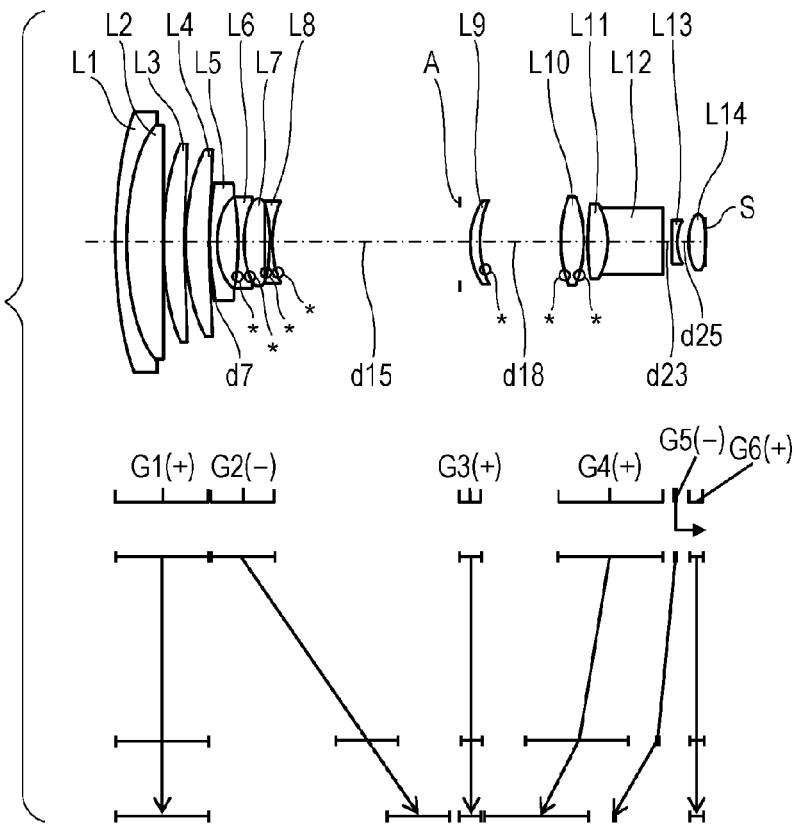
FIGS. 15A to 15C are views each illustrating a layout of a lens system included in a camera body according to the sixth exemplary embodiment.
Figure 15B:
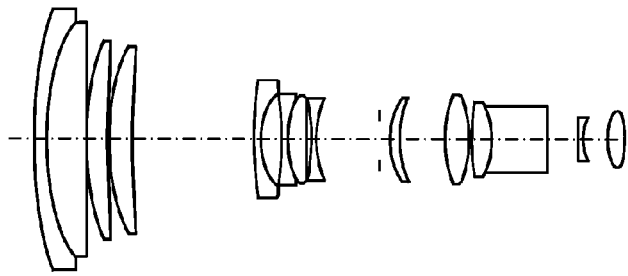
Figure 15C:
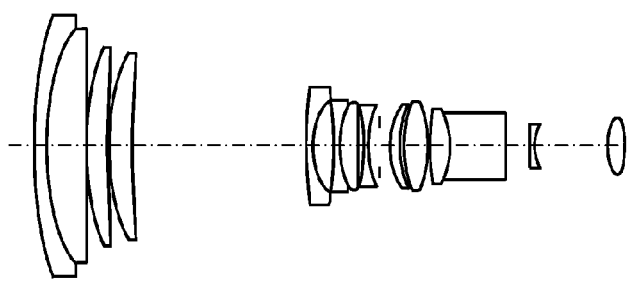

The lens system included in camera body 200 according to the sixth exemplary embodiment is hereinafter described. FIGS. 15A to 15C each illustrate a layout of the lens system in an infinity focusing state according to the sixth exemplary embodiment.

FIG. 15A illustrates a lens structure at a wide end, a part (b) illustrates a lens structure at an intermediate position, and FIG. 15C illustrates a lens structure at a tele end. The wide end illustrated in FIG. 15A corresponds to a shortest focal distance state. A focal distance in the shortest focal distance state is $f_w$. The intermediate position illustrated in FIG. 15B refers to an intermediate focal distance state. A focal distance $f_M$ in the intermediate focal distance state is specified by a following equation.

$$f_M = \sqrt{(f_W * f_T)} \quad \text{[Equation 1]}$$

The tele end illustrated in FIG. 15C corresponds to a longest focal distance state. A focal distance in the longest focal distance state is $f_T$. In the respective parts of the figure illustrating the layout, polygonal-line arrows shown in FIG. 15A are lines each of which connects positions of a corresponding lens group in the respective states of the wide end, intermediate position, and tele end in this order from above. Connections between the wide end and the intermediate position, and between the intermediate position and the tele end are indicated only by lines not representing actual movements of the lens groups.

The arrows given to the lens groups indicate focusing from an infinity focusing state to a close object focusing state. More specifically, FIGS. 15A to 15C each illustrate directions of movements at the time of focusing of fifth lens group G5 (described below) from the infinity focus state to the close object focus state. An arrow indicating focusing below a reference number of fifth lens group G5 is given only for convenience of explanation with reference to FIG. 15A showing reference numbers of respective lens groups. The directions of movements of fifth lens group G5 at the time of focusing in respective zooming states are specifically described below.

The lens system includes first lens group G1 having positive power, second lens group G2 having negative power, third lens group G3 having an aperture stop and positive power, fourth lens group G4 having positive power, fifth lens group G5 having negative power, and sixth lens group G6 having positive power.

At the time of zooming from the wide end to the tele end, the respective lens groups of the lens system move in a direction along an optical axis such that each of distances between the respective lens groups, i.e., a distance between first lens group G1 and second lens group G2, a distance between second lens group G2 and third lens group G3, a distance between third lens group G3 and fourth lens group G4, a distance between fourth lens group G4 and fifth lens group G5, a distance between fifth lens group G5 and sixth lens group G6 can vary.

Asterisks "*" given to particular surfaces in FIG. 15A show that the particular surfaces are aspherical surfaces. Signs (+) and (−) given to respective lens groups correspond to signs of power of the respective lens groups. A line shown on the rightmost side indicates a position of image surface S.

As illustrated in FIG. 15A, first lens group G1 of the lens system includes first lens element L1 having a negative meniscus shape and directing a convex surface toward the object side, second lens element L2 having a positive meniscus shape and directing a convex surface toward the object side, third lens element L3 having a positive meniscus shape and directing a convex surface toward the object side, and fourth lens element L4 having a positive meniscus shape and directing a convex surface toward the object side in this order from the object side to the image side. First lens element L1 and second lens element L2 of these lens elements are joined to each other.

Second lens group G2 includes fifth lens element L5 having a negative meniscus shape and directing a convex surface toward the object side, sixth lens element L6 having a biconcave shape, seventh lens element L7 having a biconvex shape, and eighth lens element L8 having a biconcave shape in this order from the object side to the image side. An object side surface and an image side surface of sixth lens element L6 are aspherical surfaces. An object side surface of eighth lens element L8 is an aspherical surface.

Third lens group G3 includes aperture stop A, and ninth lens element L9 having a positive meniscus shape and directing a convex surface toward the object side in this order from the object side to the image side. An image side surface of ninth lens element L9 is an aspherical surface.

Fourth lens group G4 includes tenth lens element L10 having a biconvex shape, eleventh lens element L11 having a biconvex shape, and twelfth lens element L12 having a negative meniscus shape and directing a convex surface toward the image side in this order from the object side to the image side. Eleventh lens element L11 and twelfth lens element L12 of these lens elements are joined to each other. An object side surface and an image side surface of tenth lens element L10 are aspherical surfaces.

Fifth lens group G5 is only constituted by thirteenth lens element L13 having a biconcave shape.

Sixth lens group G6 is only constituted by fourteenth lens element L14 having a biconvex shape.

According to the lens system of the sixth exemplary embodiment, eighth lens element L8 corresponding to a lens element for constituting second lens group G2 corrects aberration generated by deviation between dome cover 10 and optical axis O of camera body 200 as described below. Accordingly, eighth lens element L8 corresponds to correction optical system 360 shifting perpendicularly to optical axis O.

At the time of zooming from the wide end to the tele end for imaging, first lens group G1, aperture stop A and third lens group G3, and sixth lens group G6 do not shift. On the other hand, second lens group G2 monotonously shifts toward the image side, while fourth lens group G4 and fifth lens group G5 shift toward the object side. In other words, the respective lens groups shift along the optical axis at the time of zooming such that the distances between first lens group G1 and second lens group G2 and between fifth lens group G5 and sixth lens group G6 increase, that the distances between second lens group G2 and third lens group G3 and between third lens group G3 and fourth lens group G4 decrease, and that the distance between fourth lens group G4 and fifth lens group G5 varies.

At the time of focusing from the infinity focusing state to the close object focusing state, fifth lens group G5 corresponding to a focusing lens group shifts along the optical axis toward the image side in any zooming states.

6-2. Operation

Figure 14A:
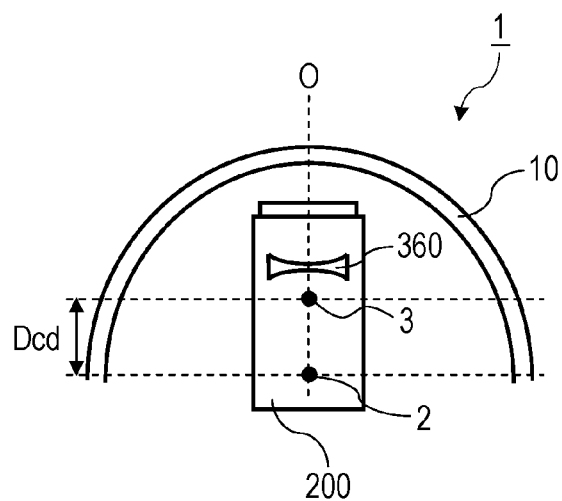
FIG. 14A is an explanatory view illustrating a relationship between operation of a camera body and operation of a correction optical system included in a dome camera according to a sixth exemplary embodiment in a state of zenith direction imaging.
Figure 14B:
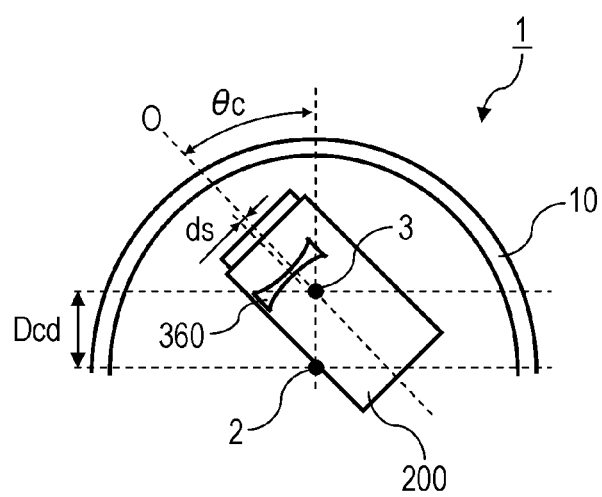
FIG. 14B is an explanatory view illustrating a relationship between operation of the camera body and operation of the correction optical system included in the dome camera according to the sixth exemplary embodiment in a state of oblique imaging.
Figure 14C:
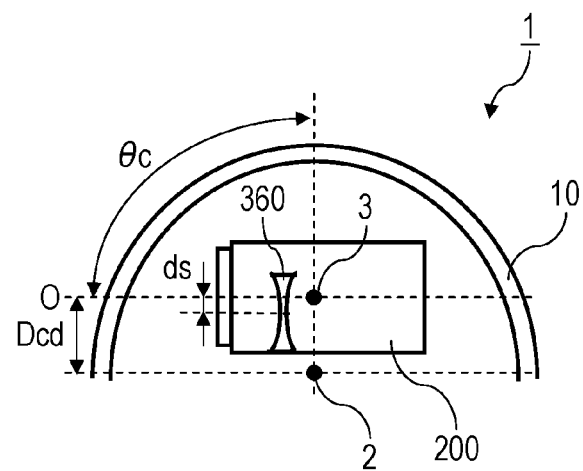
FIG. 14C is an explanatory view illustrating a relationship between operation of the camera body and operation of the correction optical system included in the dome camera according to the sixth exemplary embodiment in a state of horizontal imaging.
Figure 14D:
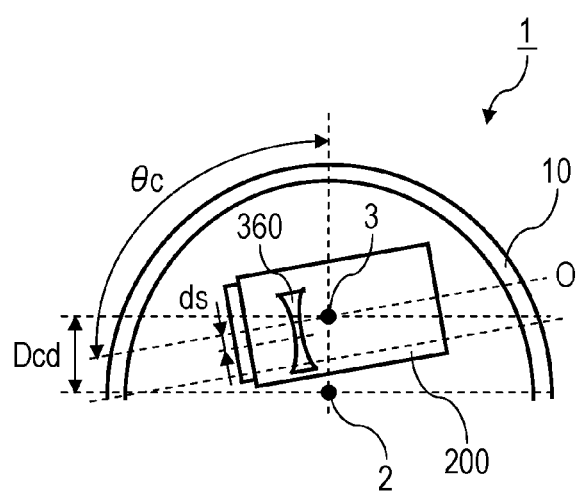
FIG. 14D is an explanatory view illustrating a relationship between operation of the camera body and operation of the correction optical system included in the dome camera according to the sixth exemplary embodiment in a state of oblique imaging in a direction opposite to a zenith.

FIGS. 14A to 14D are views schematically illustrating cross sections of dome camera 1 according to the sixth exemplary embodiment, presented as explanatory views of a relationship between camera body 200 and correction optical system 360. FIG. 14A illustrates a zenith direction imaging state of dome cover 10. FIG. 14B illustrates an oblique imaging state with rotation of camera body 200 by θc from the zenith direction imaging state illustrated in FIG. 14A. FIG. 14C illustrates a horizontal imaging state perpendicular to the zenith direction of dome cover 10. FIG. 14D illustrates an oblique imaging state in a direction opposite to the zenith, with rotation of camera body 200 by θc to shift from the horizontal imaging state illustrated in FIG. 14C toward the side opposite to the zenith. Camera body 200 rotates around a center axis corresponding to rotation center 3 of camera body 200. Rotation center 3 of camera body 200 is located at a position shifted toward the zenith of dome cover 10 from a spherical center position (curvature center 2) of dome cover 10.

Operation of dome camera 1 according to the sixth exemplary embodiment is hereinafter described with reference to FIGS. 14A through 14D, with particular attention given to operation of correction optical system 360.

When the zooming position of the lens system is located at the wide end, correction optical system 360 is not decentered regardless of rotation angle θc of camera body 200.

When the zooming position of the lens system is located at the intermediate position, correction optical system 360 operates as follows. In the state illustrated in FIG. 14A, i.e., when rotation angle θc of camera body 200 is 0°, correction optical system 360 does not decenter. In the state illustrated in FIG. 14B, i.e., when camera body 200 rotates by θc, correction optical system 360 decenters perpendicularly to optical axis O of camera body 200 in a direction opposite to the zenith in accordance with rotation of camera body 200. Correction optical system 360 decenters such that decenter amount ds of correction optical system 360 becomes the maximum when θc is 90°. After θc exceeds 90°, ds gradually decreases.

Basic operation performed by correction optical system 360 when the zooming position of the lens system is located at the tele end is similar to the operation of correction optical system 360 at the intermediate position. However, decenter amount ds at the tele end is larger than decenter amount ds at the intermediate position.

6-3. Advantageous Effects and Others

According to dome camera 1 of the sixth exemplary embodiment, aberration generated as a result of decenter between dome cover 10 and optical axis O of camera body 200 is appropriately correctable.

Figure 16A:
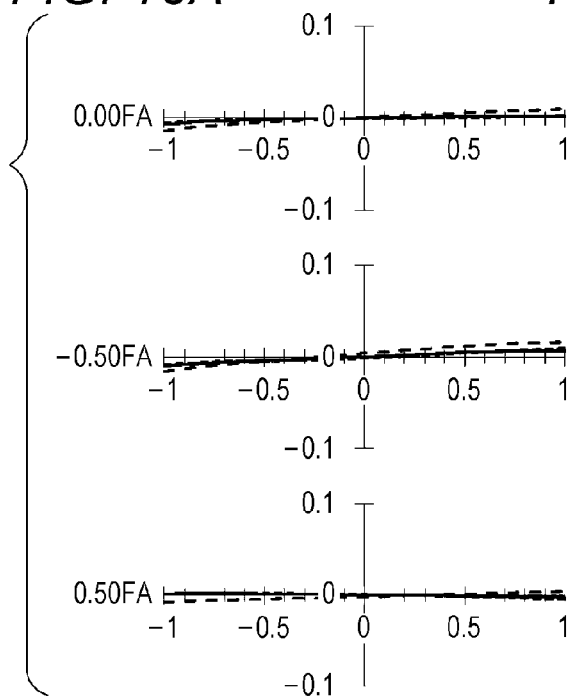
FIGS. 16A to 16D each illustrate lateral aberration at a tele end of the dome camera according to the sixth exemplary embodiment in a state corrected by the correction optical system and in a state not corrected by the correction optical system.
Figure 16B:
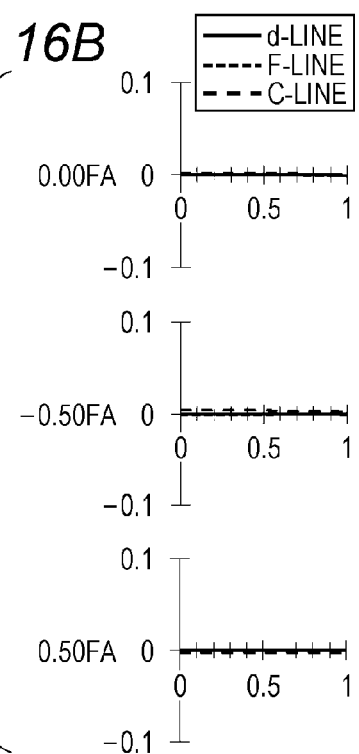
Figure 16C:
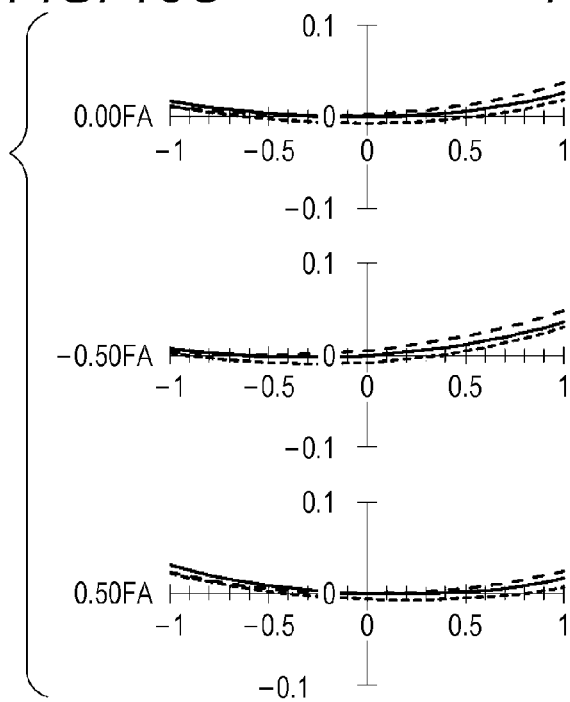
Figure 16D:
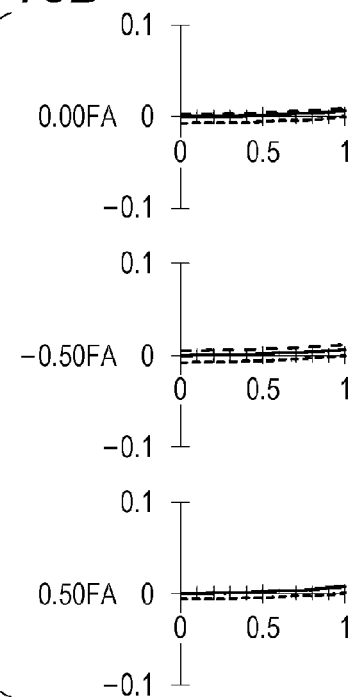

Advantageous effects of dome camera 1 according to the sixth exemplary embodiment are now described with reference to FIGS. 16A to 16D. FIGS. 16A and 16B are diagrams illustrating lateral aberration at the tele end in the horizontal imaging (θc=90°) when corrected by correction optical system 360, while FIGS. 16C and 16D illustrate lateral aberration at the tele end in the horizontal imaging (θc=90°) when not corrected by correction optical system 360. FIGS. 16A and 16C are diagrams illustrating lateral aberration in a meridional direction, while FIGS. 16B and 16D illustrate lateral aberration in a sagittal direction. Solid lines indicate characteristics of d line (d-line), short broken lines indicate characteristics of F line (F-line), and long broken lines indicate characteristics of C line (C-line). Respective aberrations recognized in FIGS. 16C and 16D are improved in FIGS. 16A and 16B. Based on these results, it is considered that particularly coma aberration and chromatic aberration are improved by decenter of correction optical system 360.

Seventh Exemplary Embodiment

7-1. Configuration

7-1-1. General Configuration

A general configuration of a dome camera according to a seventh exemplary embodiment is hereinafter described with reference to FIGS. 17A to 17D. Dome camera 1 according to the seventh exemplary embodiment includes camera body 200 and dome cover 10.

Camera body 200 disposed inside dome cover 10 contains a lens system and an imaging device. According to dome camera 1 of the seventh exemplary embodiment, the lens system is a zoom lens system, while dome cover 10 has a substantially semispherical shape.

Dome camera 1 includes a pan motor (not shown) and a tilt motor (not shown). Camera body 200 is rotatable in a pan direction and a tilt direction with respect to dome cover 10 by rotations of the pan motor and the tilt motor. Operations of the pan motor and the tilt motor are controlled by a controller such as a microcomputer.

7-1-2. Lens Configuration

Figure 18A:
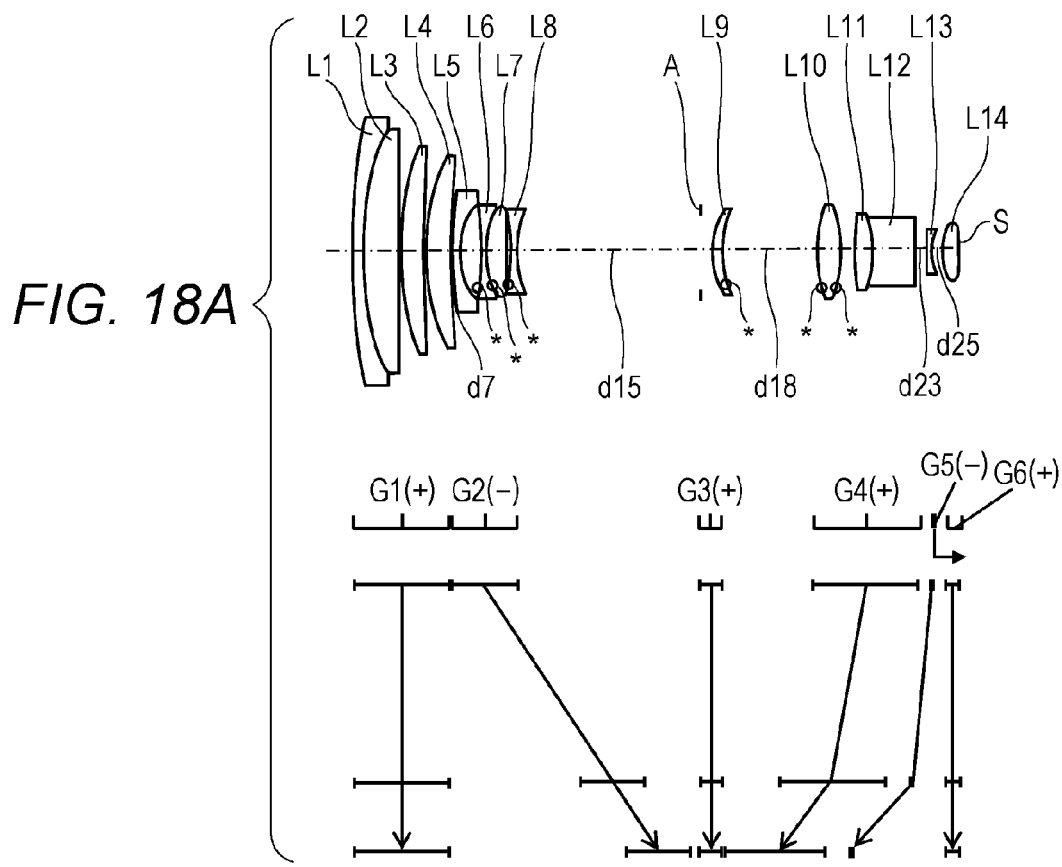
FIGS. 18A to 18C are views each illustrating a layout of a lens system included in a camera body according to the seventh exemplary embodiment.
Figure 18B:
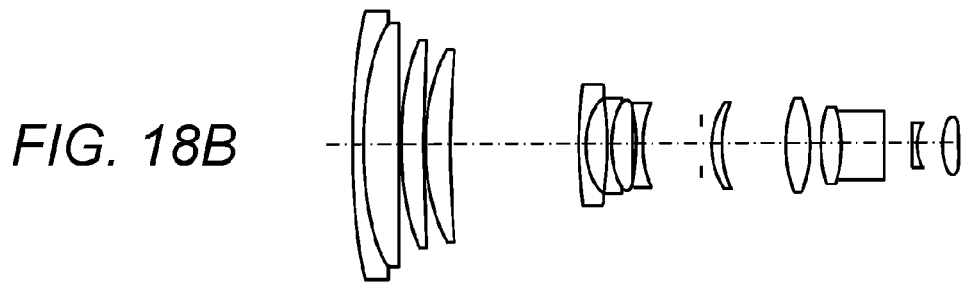
Figure 18C:
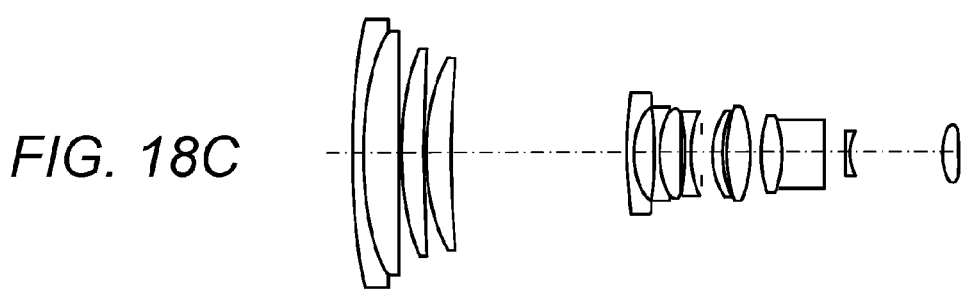

The lens system included in camera body 200 according to the seventh exemplary embodiment is hereinafter described. FIGS. 18A to 18C each illustrate a layout of the lens system in an infinity focusing state according to the seventh exemplary embodiment.

FIG. 18A illustrates a lens structure at a wide end, FIG. 18B illustrates a lens structure at an intermediate position, and FIG. 18C illustrates a lens structure at a tele end. The wide end illustrated in FIG. 18A corresponds to a shortest focal distance state. A focal distance in the shortest focal distance state is $f_W$. The intermediate position illustrated in FIG. 18B refers to an intermediate focal distance state. A focal distance $f_M$ in the intermediate focal distance state is specified by a following equation.

$$f_M = \sqrt{(f_W * f_T)} \qquad \text{[Equation 1]}$$

The tele end illustrated in FIG. 18C corresponds to a longest focal distance state. A focal distance in the longest focal distance state is $f_T$. In the respective parts of the figure illustrating the layout, polygonal-line arrows shown in FIG. 18A are lines each of which connects positions of a corresponding lens group in the respective states of the wide end, intermediate position, and tele end in this order from above. Connections between the wide end and the intermediate position, and between the intermediate position and the tele end are indicated only by lines not representing actual movements of the lens groups.

The arrows given to the lens groups indicate focusing from an infinity focusing state to a close object focusing state. More specifically, FIGS. 18A to 18C each illustrate directions of movements at the time of focusing of fifth lens group G5 (described below) from the infinity focusing state to the close object focusing state. An arrow indicating focusing below a reference number of fifth lens group G5 is given only for convenience of explanation with reference to FIG. 18A showing reference numbers of respective lens groups. The directions of movements of fifth lens group G5 at the time of focusing in respective zooming states are specifically described below.

The lens system includes first lens group G1 having positive power, second lens group G2 having negative power, third lens group G3 having an aperture stop and positive power, fourth lens group G4 having positive power, fifth lens group G5 having negative power, and sixth lens group G6 having positive power in this order from the object side to the image side At the time of zooming from the wide end to the tele end, the respective lens groups of the lens system move in a direction along an optical axis such that each of distances between the respective lens groups, i.e., a distance between first lens group G1 and second lens group G2, a distance between second lens group G2 and third lens group G3, a distance between third lens group G3 and fourth lens group G4

G4, a distance between fourth lens group G4 and fifth lens group G5, a distance between fifth lens group G5 and sixth lens group G6 can vary.

Asterisks "*" given to particular surfaces in FIG. 18A show that the particular surfaces are aspherical surfaces. Signs (+) and (−) given to respective lens groups correspond to signs of power of the respective lens groups. A line shown on the rightmost side indicates a position of image surface S.

As illustrated in FIG. 18A, first lens group G1 of the lens system includes first lens element L1 having a negative meniscus shape and directing a convex surface toward the object side, second lens element L2 having a biconvex shape, third lens element L3 having a positive meniscus shape and directing a convex surface toward the object side, and fourth lens element L4 having a positive meniscus shape and directing a convex surface toward the object side in this order from the object side to the image side. First lens element L1 and second lens element L2 of these lens elements are joined to each other.

Second lens group G2 includes fifth lens element L5 having a negative meniscus shape and directing a convex surface toward the object side, sixth lens element L6 having a biconcave shape, seventh lens element L7 having a biconvex shape, and eighth lens element L8 having a biconcave shape in this order from the object side to the image side. An object side surface and an image surface side surface of sixth lens element L6 are aspherical.

Third lens group G3 includes aperture stop A, and ninth lens element L9 having a positive meniscus shape and directing a convex surface toward the object side in this order from the object side to the image side. An image side surface of ninth lens element L9 is an aspherical surface.

Fourth lens group G4 includes tenth lens element L10 having a biconvex shape, eleventh lens element L11 having a biconvex shape, and twelfth lens element L12 having a negative meniscus shape and directing a convex surface toward the image side in this order from the object side to the image side. Eleventh lens element L11 and twelfth lens element L12 of these lens elements are joined to each other. An object side surface and an image side surface of tenth lens element L10 are aspherical surfaces.

Fifth lens group G5 is only constituted by thirteenth lens element L13 having a biconcave shape.

Sixth lens group G6 is only constituted by fourteenth lens element L14 having a biconvex shape.

According to the lens system of the seventh exemplary embodiment, ninth lens element L9 corresponding to a lens element for constituting third lens group G3 corrects aberration generated by deviation between dome cover 10 and optical axis O of camera body 200 as described below. Accordingly, ninth lens element L9 corresponds to correction optical system 370 shifting perpendicularly to optical axis O.

At the time of zooming from the wide end to the tele end for imaging, first lens group G1, aperture stop A and third lens group G3, and sixth lens group G6 do not shift. On the other hand, second lens group G2 monotonously shifts toward the image side, while fourth lens group G4 and fifth lens group G5 shift toward the object side. In other words, the respective lens groups shift along the optical axis at the time of zooming such that the distances between first lens group G1 and second lens group G2 and between fifth lens group G5 and sixth lens group G6 increase, that the distances between second lens group G2 and third lens group G3 and between third lens group G3 and fourth lens group G4 decrease, and that the distance between fourth lens group G4 and fifth lens group G5 varies.

At the time of focusing from the infinity focusing state to the close object focusing state, fifth lens group G5 corresponding to a focusing lens group shifts along the optical axis toward the image side in any zooming states.

7-2. Operation

Figure 17A:
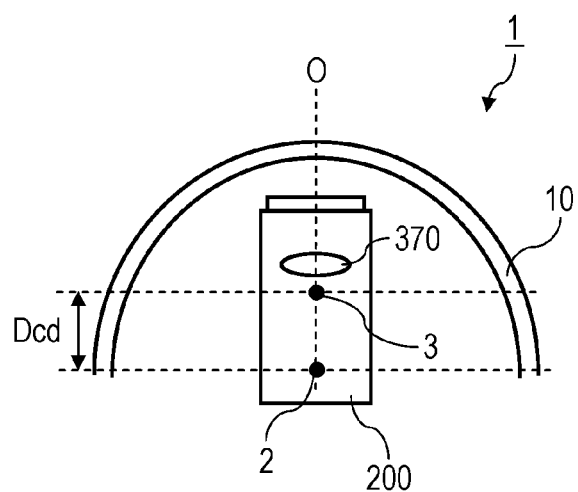
FIG. 17A is an explanatory view illustrating a relationship between operation of a camera body and operation of a correction optical system included in a dome camera according to a seventh exemplary embodiment in a state of zenith direction imaging.
Figure 17B:
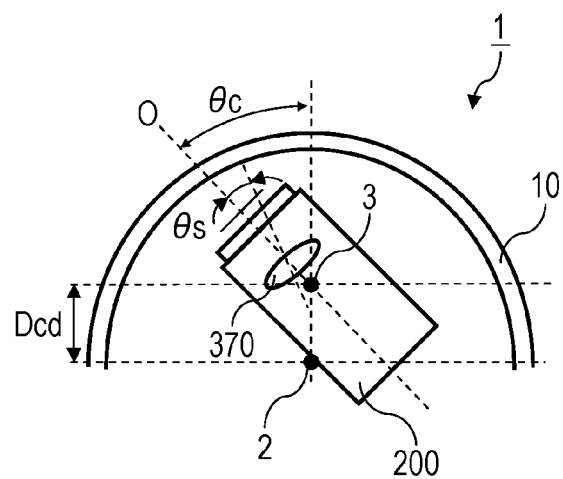
FIG. 17B is an explanatory view illustrating a relationship between operation of the camera body and operation of the correction optical system included in the dome camera according to the seventh exemplary embodiment in a state of oblique imaging.
Figure 17C:
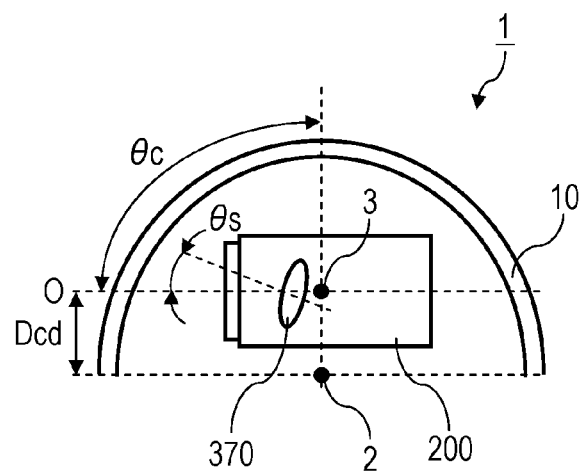
FIG. 17C is an explanatory view illustrating a relationship between operation of the camera body and operation of the correction optical system included in the dome camera according to the seventh exemplary embodiment in a state of horizontal imaging.
Figure 17D:
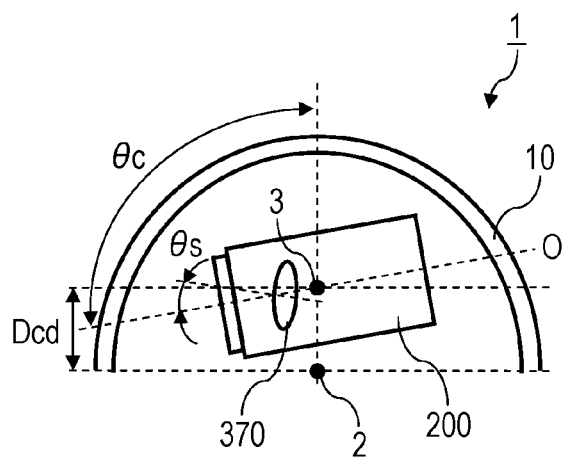
FIG. 17D is an explanatory view illustrating a relationship between operation of the camera body and operation of the correction optical system included in the dome camera according to the seventh exemplary embodiment in a state of oblique imaging in a direction opposite to a zenith.

FIGS. 17A to 17D are views schematically illustrating cross sections of dome camera 1 according to the seventh exemplary embodiment, presented as explanatory views of a relationship between camera body 200 and correction optical system 370. FIG. 17A illustrates a zenith direction imaging state of dome cover 10. FIG. 17B illustrates an oblique imaging state with rotation of camera body 200 by θc from the zenith direction imaging state illustrated in FIG. 17A. FIG. 17C illustrates a horizontal imaging state perpendicular to the zenith direction of dome cover 10. FIG. 17D illustrates an oblique imaging state in a direction opposite to the zenith, with rotation of camera body 200 by θc to shift from the horizontal imaging state illustrated in FIG. 17C toward the side opposite to the zenith. Camera body 200 rotates around a center axis corresponding to rotation center 3 of camera body 200. Rotation center 3 of camera body 200 is located at a position shifted toward the zenith of dome cover 10 from a spherical center position (curvature center 2) of dome cover 10.

Operation of dome camera 1 according to the seventh exemplary embodiment is hereinafter described with reference to FIGS. 17A to 17D, with particular attention given to operation of correction optical system 370.

When camera body 200 performs imaging in the zenith direction of dome cover 10 as illustrated in FIG. 17A, a center of correction optical system 370 is located on optical axis O of correction optical system 370. Correction optical system 370 is tilted around a surface top of the object side surface of correction optical system 370 in a direction opposite to the zenith as camera body 200 rotates toward the horizontal direction from the state illustrated in FIG. 17A. The "tilt" in this context is a movement in a state that a rotation center of correction optical system 370 is located on correction optical system 370. Tilt angle θs of correction optical system 370 becomes 0° when the imaging direction of camera body 200 corresponds to the zenith direction of dome cover 10. An absolute value of θs increases as rotation angle θc of camera body 200 increases. The absolute value of θs becomes the maximum when θc is 90°. After θc exceeds 90°, the absolute value of θs decreases as illustrated in FIG. 17D.

7-3. Advantageous Effects and Others

According to dome camera 1 of the seventh exemplary embodiment, aberration generated as a result of decenter between dome cover 10 and optical axis O of camera body 200 is appropriately correctable.

Figure 19A:
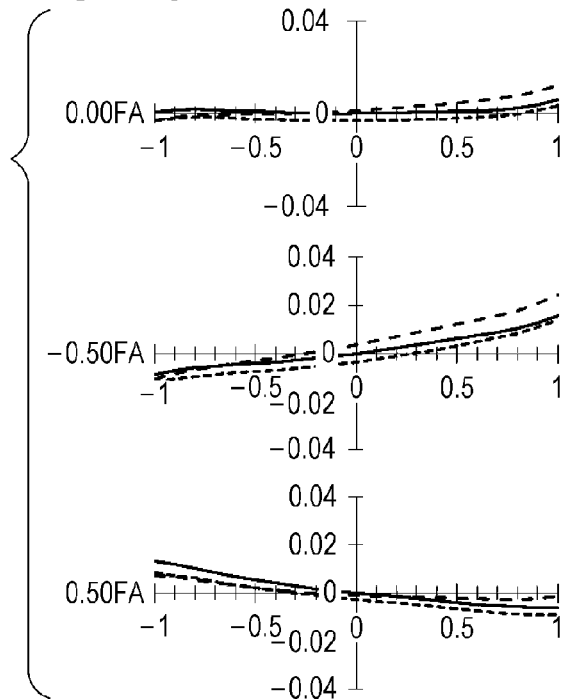
FIGS. 19A to 19D each illustrate lateral aberration at a tele end of the dome camera according to the seventh exemplary embodiment in a state corrected by the correction optical system and in a state not corrected by the correction optical system.
Figure 19B:
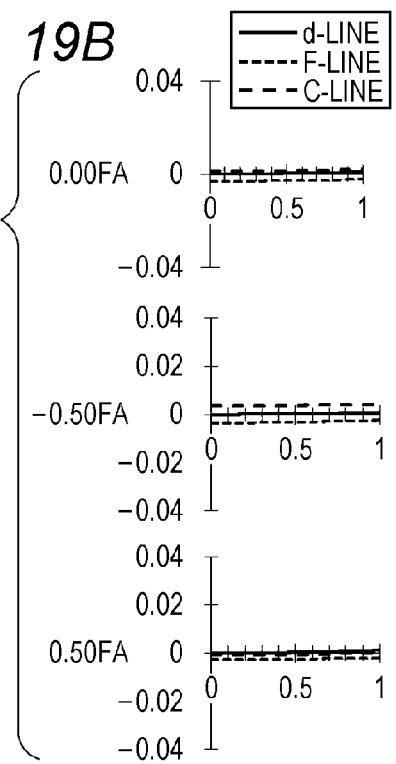
Figure 19C:
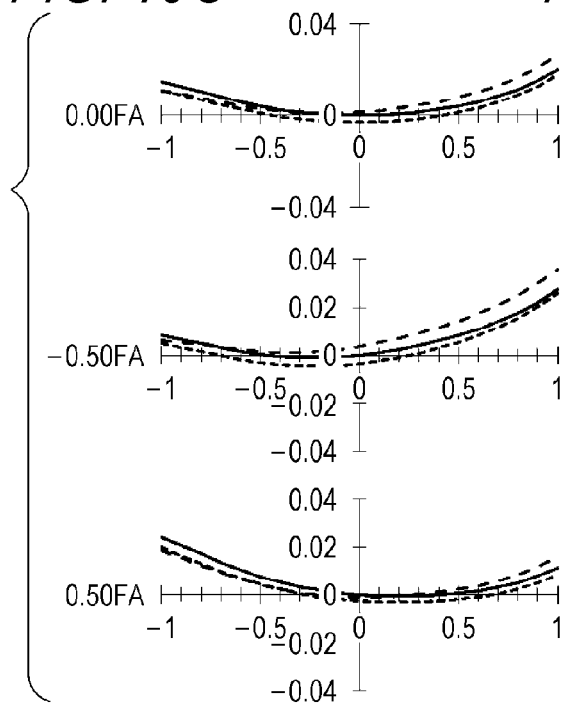
Figure 19D:
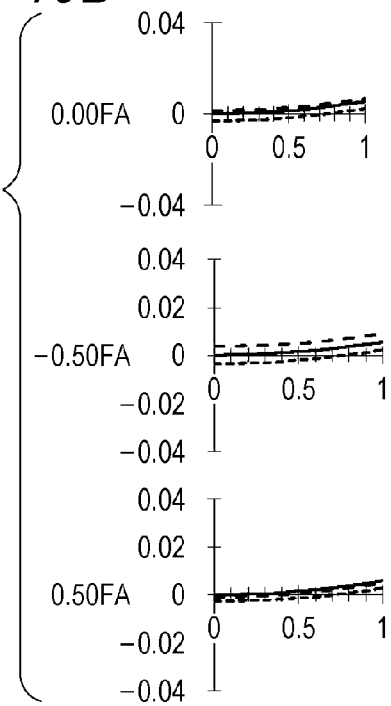

Advantageous effects of dome camera 1 according to the seventh exemplary embodiment are now described with reference to FIGS. 19A to 19D. FIGS. 19A and 19B are diagrams illustrating lateral aberration at the tele end in the horizontal imaging (θc=90°) when corrected by correction optical system 370, while FIGS. 19C and 19D illustrate lateral aberration at the tele end in the horizontal imaging (θc=90°) when not corrected by correction optical system 370. FIGS. 19A and 19C are diagrams illustrating lateral aberration in a meridional direction, while FIGS. 19B and 19D illustrate lateral aberration in a sagittal direction. Solid lines indicate characteristics of d line (d-line), short broken lines indicate characteristics of F line (F-line), and long broken lines indicate characteristics of C line (C-line). Respective aberrations recognized in FIGS. 19C and 19D are improved in FIGS. 19A and 19B. Based on these results, it is considered that particularly coma aberration is improved by tilt of correction optical system 370.

It is advantageous that following conditions (1) and (2) are met by a dome camera which includes a dome cover containing a spherical portion and a cylindrical portion, and further includes a correction optical system disposed between a lens system and the dome cover and configured such that curvature in a vertex direction is different from curvature in a direction perpendicular to the vertex direction, such as the dome cameras according to the first and second exemplary embodiments.

$$0.7 < fgx/fd < 1.3 \quad (1)$$

$$0.7 < fgy/fd < 1.3 \quad (2)$$

In conditions (1) and (2), fgx: synthesized focal distance of correction optical system and cylindrical portion of dome cover in direction perpendicular to vertex direction fgy: synthesized focal distance of correction optical system and cylindrical portion of dome cover in vertex direction fd: focal distance of spherical portion of dome cover.

In excess of an upper limit of condition (1) and/or condition (2), the focal distance of the cylindrical portion of the dome cover decreases. In this case, focusing positions of the cylindrical portion and the spherical portion deviate from each other, therefore blurring may be generated in an obtained image. In excess of a lower limit of condition (1) and/or condition (2), the focal distance of the cylindrical portion of the dome cover increases. In this case, focusing positions of the cylindrical portion and the spherical portion deviate from each other, therefore blurring may be generated in an obtained image.

When at least either one of following conditions (1)' and (2)' is met, the advantages discussed above further increase.

$$0.9 < fgx/fd < 1.1 \quad (1)'$$

$$0.9 < fgy/fd < 1.1 \quad (2)'$$

It is advantageous that following condition (3) is met by a dome camera which includes a dome cover containing a spherical portion, and further includes a correction optical system disposed between a lens system and the dome cover, such as the dome cameras according to the third through fifth exemplary embodiments.

$$1.5 < |fs/fd| < 2.5 \quad (3)$$

In condition (3), fs: focal distance of correction optical system fd: focal distance of spherical portion of dome cover.

In excess of an upper limit of condition (3), a shift amount of the correction optical system increases. In this case, positioning of the correction optical system between the lens system and the dome cover becomes difficult. In excess of a lower limit of condition (3), correction of aberration generated by deviation between the dome cover and the camera body becomes difficult.

When following condition (3)' is met, the advantages discussed above further increase.

$$1.8 < |fs/fd| < 2.2 \quad (3)'$$

It is advantageous that following condition (4) is met by a dome camera which includes a correction optical system disposed within lens groups constituting a lens system, such as the dome cameras according to the sixth and seventh exemplary embodiments.

$$0.8 < |fs/fsg| < 3.5 \quad (4)$$

In condition (4), fs: focal distance of correction optical system fsg: synthesized focal distance of whole lens groups where correction optical system is disposed.

In excess of an upper limit of condition (4), a shift amount of the correction optical system increases. In excess of a lower limit of condition (4), correction of aberration generated by deviation between the dome cover and the camera body becomes difficult.

When following condition (4)' is met, the advantages discussed above further increase.

$$1.5 < |fs/fsg| < 3.0 \quad (4)'$$

According to the first and second exemplary embodiments, the light shielding portion provided on the dome cover side surface of the correction optical system removes a ghost passing through the boundary surface between the cylindrical portion and the spherical portion of the dome cover, a ghost passing through the cylindrical portion and not passing through the correction optical system, a ghost passing through the spherical portion and passing through the correction optical system, and a ghost generated from the vertex end of the correction optical system.

According to the first and second exemplary embodiments, a range of a generated ghost decreases by insertion of the correction optical system, in which condition the area of the light shielding portion added to the structure is allowed to decrease. Accordingly, lowering of the light amount caused by the presence of the light shielding portion decreases. It is more advantageous that the correction optical system is shifted such that the optical axis of the camera body becomes parallel with the line connecting the boundary between the cylindrical portion and the spherical portion of the dome cover and the zenith side end of the correction optical system in accordance with the rotation angle of the camera body.

According to the first and second exemplary embodiments, generated aberration is small at the wide end of the zooming position of the lens system even when light passes through the cylindrical portion of the dome cover. In this case, the necessity of using the correction optical system is eliminated at the wide end having a wide imaging angle of view, therefore the area of the correction optical system is allowed to decrease. When the light shielding portion is provided on a front surface of the correction optical system, a light flux diameter becomes small at the wide end. In this case, lowering of the light amount caused by the presence of the light shielding portion becomes remarkable, therefore it is advantageous that the correction optical system is retracted at the wide end.

According to the first through seventh exemplary embodiments, the rotation center of the camera body is located at a position shifted toward the zenith of the dome cover from the spherical center position (curvature center) of the dome cover. This structure reduces vignetting and the like generated on an installation surface at the time of rotation of the camera body.

According to the first through seventh exemplary embodiments, the curvature center of the inside surface of the dome cover is shifted toward the zenith from the curvature center of the outside surface of the dome cover. This structure reduces astigmatism and coma aberration generated by deviation between the curvature center of the dome cover and the optical axis of the camera body.

According to the first through third exemplary embodiments, the correction optical system is constituted by the optical device made of resin material. This structure reduces a weight of the correction optical system, thereby achieving miniaturization of an actuator or the like.

According to the first through third, sixth, and seventh exemplary embodiments, the correction optical system is constituted by one optical device. This structure reduces a weight of the correction optical system, thereby achieving miniaturization of an actuator or the like.

According to the first and second exemplary embodiments, the surface of the correction optical system on the subject side of the camera body and the surface of the correction optical system on the image surface side of the camera body decenter from each other. In other words, the curvature center of the surface on the subject side and the curvature center of the surface on the image surface side deviate from each other. Accordingly, deviation between the optical axis of light ray passing through the spherical portion and the optical axis of light ray passing through the cylindrical portion of the dome cover decreases.

According to the first through fifth exemplary embodiments, the correction optical system is retracted when the rotation angle of the camera body lies in the range from 0° to 85°. This structure decreases lowering of a light amount caused by the light shielding portion of the correction optical system, and reduces the size of the correction optical system.

According to the first exemplary embodiment, the correction optical system is retracted in the direction opposite to the zenith of the dome cover. This structure avoids overlap between the correction optical system and light ray passing through the spherical surface of the dome cover during insertion of the correction optical system, thereby reducing deterioration of images.

According to the second exemplary embodiment, the presence of the flat portion of the correction optical system eliminates formation of the ends of the curved portion of the correction optical system. This structure reduces a ghost generated at the ends of the curved portion.

The correction optical system adopted in the third through fifth exemplary embodiments has a spherical surface. This structure lowers manufacturing costs. In addition, the center of the correction optical system is located on the optical axis of the camera body when the zooming position of the lens system is disposed at the wide end. In this case, the correction optical system does not shift even when the camera body rotates. This structure reduces aberration at the wide end caused by the dome cover. Furthermore, the unnecessity of the correction optical system at the wide end having a wide angle of view contributes to size reduction of the correction optical system.

According to the first through fifth exemplary embodiments, the correction optical system is disposed between the lens system of the camera body and the dome cover. This structure allows use of a general-purpose lens system functioning as the lens system. Moreover, the correction optical system not disposed on the outside of the dome cover becomes compact.

According to the fourth and fifth exemplary embodiments, the correction optical system includes the lens element having negative power and the lens element having positive power, and shifts one of these lens elements. This structure reduces the shift amount of the correction optical system, thereby further decreasing the size of the correction optical system.

According to the third exemplary embodiment, the correction optical system is constituted by the lens element having positive power in consideration of the shape of the dome cover having negative power. Accordingly, the correction optical system is decentered in the direction opposite to the zenith. When constituted by a lens element having negative power, the correction optical system is decentered toward the zenith. This structure corrects aberration generated as a result of deviation between the optical axis of the camera and the spherical center position of the dome cover caused by rotation of the camera body.

According to the sixth and seventh exemplary embodiments, the lens element corresponding to the correction optical system has an aspherical surface. This structure controls aberration generated by the dome cover, and sensitivities of one-sided blurring and coma aberration reduced by the correction optical system. Particularly when the correction optical system is provided within the lens system of the camera body, coma aberration and one-sided blurring generated as a result of deviation between the optical axis of the camera body and the curvature center of the dome cover are both correctable. Moreover, the structure providing the correction optical system within the lens system of the camera body reduces the size of the correction optical system.

According to the sixth exemplary embodiment, the correction optical system corresponds to the one lens element constituting the second lens group. In this case, decenter coma aberration and one-sided blurring generated as a result of decenter of the dome cover are appropriately corrected by decentering correction within the lens system.

According to the seventh exemplary embodiment, the dome cover is made of a material having an Abbe number (vd) of 45.0 or larger for d line. This structure reduces a chromatic aberration amount generated as a result of decenter of the dome cover.

The first through seventh exemplary embodiments of the technology disclosed in the present application have been described herein by way of example. However, the technology of the present disclosure is not limited to these exemplary embodiments, but is applicable to embodiments including appropriate modifications, replacements, additions, omissions and others.

Presented hereinbelow are results of specific numerical examples obtained when the dome cameras according to the first through seventh exemplary embodiments are used. In the respective numerical examples, all lengths included in following tables are given in "mm", while all angles of view are given in "°". In the respective numerical examples, r indicates a radius of curvature, d indicates a distance between surfaces, nd indicates a refractive index for d line, and vd indicates an Abbe number for d line. In the respective numerical examples, each of surfaces to which a mark "*" has been given is aspherical. The aspherical shape is defined by a following equation.

$$Z = \frac{h^2/r}{1 + \sqrt{1-(1+\kappa)(h/r)^2}} + \sum A_n h^n \quad \text{[Equation 2]}$$

In the above equation,

Z: distance between point on aspherical surface having height h from optical axis and tangent plane of aspherical vertex h: height from optical axis r: radius of curvature at vertex κ: conic constant $A_n$: n-th degree aspherical coefficient.

A Y-axis direction is a direction crossing the optical axis of the camera body at right angles in a plane of rotation of the camera body. An X-axis direction is a direction crossing the optical axis of the camera body at right angles in a plane perpendicular to the plane of rotation of the camera body.

Numerical Example 1

A dome camera according to Numerical Example 1 corresponds to the dome camera according to the first exemplary embodiment illustrated in FIGS. 1A to 1D. Presented hereinbelow are data 1 indicating surface data, data 2 indicating aspherical surface data, and data 3 indicating various data, concerning a lens system included in the dome camera of Numerical Example 1. A lens system similar to this lens system is included in each of dome cameras according to Numerical Examples 2 through 5 described below.

Data 1 (Lens System Surface Data)

| Surface No. | r | d | nd | vd |
|---|---|---|---|---|
| Object Surface | ∞ | | | |
| 1 | 72.78340 | 1.60000 | 1.74077 | 27.8 |
| 2 | 37.67770 | 5.63400 | 1.49700 | 81.6 |
| 3 | 457.47300 | 0.20000 | | |
| 4 | 48.10910 | 3.00260 | 1.49700 | 81.6 |
| 5 | 137.39320 | 0.20000 | | |
| 6 | 30.90390 | 3.76140 | 1.59282 | 68.6 |
| 7 | 103.12830 | Variable | | |
| 8 | 76.50390 | 0.70000 | 2.00100 | 29.1 |
| 9 | 10.80880 | 3.72580 | | |
| 10* | −27.86570 | 0.70000 | 1.88202 | 37.2 |
| 11* | 21.05490 | 0.20000 | | |
| 12 | 14.26530 | 3.63350 | 1.94595 | 18.0 |
| 13 | −28.58790 | 0.25470 | | |
| 14 | −21.49780 | 0.60000 | 1.88300 | 40.8 |
| 15 | 26.59080 | Variable | | |
| 16 (Stop) | ∞ | 1.50000 | | |
| 17 | 10.55650 | 1.76360 | 1.52500 | 70.3 |
| 18* | 20.29220 | Variable | | |
| 19* | 16.18990 | 3.25910 | 1.77200 | 50.0 |
| 20* | −22.60900 | 0.20000 | | |
| 21 | 44.54910 | 3.10260 | 1.59349 | 67.0 |
| 22 | −10.95280 | 5.78440 | 1.84666 | 23.8 |
| 23 | −138.77990 | Variable | | |
| 24 | −186.60770 | 0.50000 | 1.88300 | 40.8 |
| 25 | 7.44910 | Variable | | |
| 26 | 10.90320 | 2.01050 | 1.59001 | 39.0 |
| 27 | −28.32570 | (BF) | | |
| Image Surface | ∞ | | | |

Data 2 (Lens System Aspherical Surface Data)

10th Surface

K = 0.00000E+00, A4 = 6.91843E−□05, A6 = −1.08677E−□08

11th Surface

K = 0.00000E+00, A4 = 1.01545E−□04, A6 = 1.20781E−□07

18th Surface

K = 0.00000E+00, A4 = 1.11026E−□04, A6 = 8.04632E−□07

19th Surface

K = 0.00000E+00, A4 = −4.27218E−□05, A6 = 4.11333E−□07

20th Surface

K = 0.00000E+00, A4 = 5.51316E−□05, A6 = 9.20738E−□08

Data 3 (Lens System Various Data)
Zoom Ratio 28.24653

| | Wide | Intermediate | Tele |
|---|---|---|---|
| Focal Distance | 4.4288 | 25.0089 | 125.0976 |
| F number | 1.64816 | 4.01400 | 4.98774 |
| Angle of View | 37.7062 | 7.2236 | 1.4503 |
| Image Height | 3.2200 | 3.2200 | 3.2200 |
| Full Lens Length | 89.7266 | 89.7386 | 89.7389 |
| BF | 3.52690 | 3.53904 | 3.53922 |
| d7 | 0.5000 | 19.9236 | 27.9497 |
| d15 | 29.1244 | 9.7008 | 1.6747 |
| d18 | 10.6432 | 6.2399 | 0.5000 |
| d23 | 1.6010 | 4.0914 | 1.5983 |
| d25 | 1.9989 | 3.9117 | 12.1448 |

In this table, d23 and d25 are focus position data at infinity without dome cover.

Presented hereinbelow are data 4 indicating shape data on the spherical portion of the dome cover, data 5 indicating shape data on the cylindrical portion of the dome cover, data 6 indicating shape data on the correction optical system, data 7 indicating lens system focus position data at infinity in horizontal imaging, data 8 indicating decenter amount data of correction optical system, and data 9 indicating other data, concerning the dome camera according to Numerical Example 1.

Data 4 (Shape Data on Spherical Portion of Dome Cover)

| | ry | rx | d | nd | vd |
|---|---|---|---|---|---|
| 1 | 80 | 80 | d1 | 1.585 | 29.91 |
| 2 | 77 | 77 | d2 | | |

| | Zenith Direction Imaging | Horizontal Imaging |
|---|---|---|
| d1 | 2.8 | 3.0 |
| d2 | 13.1 | 10.0 |

In zenith direction imaging, lens system comes to subsequent surface. In horizontal imaging, correction optical system comes to subsequent surface.

Data 5 (Shape Data on Cylindrical Portion of Dome Cover)

| | ry | rx | d | nd | vd |
|---|---|---|---|---|---|
| 1 | infinite | 80 | 3 | 1.585 | 29.91 |
| 2 | infinite | 77 | 10 | | |

Correction optical system comes to subsequent surface.

Data 6 (Shape Data on Correction Optical System)

| | ry | rx | d | nd | vd |
|---|---|---|---|---|---|
| 1 | 80 | infinite | 3 | 1.585 | 29.91 |
| 2 | 77 | infinite | 9.9 | | |

Lens system comes to subsequent surface.

Data 7 (Lens System Focus Position Data at Infinity in Horizontal Imaging)

| | Wide | Intermediate | Tele |
|---|---|---|---|
| d23 | 1.4700 | 4.0264 | 2.0983 |
| d25 | 2.1299 | 3.9767 | 11.6448 |

Data 8 (Decenter Amount ds (mm) Data of Correction Optical System: Shift Amount (mm) Data in Parallel with Zenith Direction)

| | Rotation Angle θc (°) of Camera Body | | | |
|---|---|---|---|---|
| | 0-85 | 85 | 90 | 105 |
| Wide - Intermediate | Retraction | Retraction | Retraction | Retraction |
| Intermediate - Tele | Retraction | 1.1374 | 0.0000 | -3.4833 |

Data 9 (Other Data)

Difference Dcd between rotation center of camera in zenith direction imaging and curvature center of front surface of dome cover: 10 mm Difference Dfr between curvature center of front surface of dome cover and curvature center of rear surface of dome cover in zenith direction imaging:

0.2 mm

Decenter amount Sfr between surfaces of correction optical system on subject side and imaging surface side of camera body: 0.21 mm Light shielding portion size: 2 mm×40 mm (X-axis direction×Y-axis direction)

Numerical Example 2

A dome camera according to Numerical Example 2 corresponds to the dome camera according to the second exemplary embodiment illustrated in FIGS. 5A to 5D. Presented hereinbelow are data 10 indicating shape data on the spherical portion of the dome cover, data 11 indicating shape data on the cylindrical portion of the dome cover, data 12 indicating shape data on the curved portion of the correction optical system, data 13 indicating shape data on the flat portion of the correction optical system, data 14 indicating lens system focus position data at infinity in horizontal imaging, data 15 indicating rotation angle data of correction optical system, and data 16 indicating other data, concerning the dome camera according to Numerical Example 2.

Data 10 (Shape Data on Spherical Portion of Dome Cover)

| | ry | rx | d | nd | vd |
|---|---|---|---|---|---|
| 1 | 80 | 80 | d1 | 1.585 | 29.91 |
| 2 | 77 | 77 | d2 | | |

Data 10 (Shape Data on Spherical Portion of Dome Cover)

| | Zenith Direction Imaging | Horizontal Imaging |
|---|---|---|
| d1 | 2.8 | 3.0 |
| d2 | 13.1 | 10.0 |

In zenith direction imaging, lens system comes to subsequent surface. In horizontal imaging, correction optical system comes to subsequent surface.

Data 11 (Shape Data on Cylindrical Portion of Dome Cover)

| | ry | rx | d | nd | vd |
|---|---|---|---|---|---|
| 1 | infinite | 80 | 3 | 1.585 | 29.91 |
| 2 | infinite | 77 | 10 | | |

Correction optical system comes to subsequent surface.

Data 12 (Shape Data on Curved Portion of Correction Optical System)

| | ry | rx | d | nd | vd |
|---|---|---|---|---|---|
| 1 | 80 | infinite | 3 | 1.585 | 29.91 |
| 2 | 77 | infinite | 9.9 | | |

Data 13 (Shape Data on Flat Portion of Correction Optical System)

| | ry | rx | d | nd | vd |
|---|---|---|---|---|---|
| 1 | infinite | infinite | 3 | 1.585 | 29.91 |
| 2 | infinite | infinite | 9.9 | | |

Data 14 (Lens System Focus Position Data at Infinity in Horizontal Imaging)

| | Wide | Intermediate | Tele |
|---|---|---|---|
| d23 | 1.4730 | 4.0264 | 2.0983 |
| d25 | 2.1269 | 3.9767 | 11.6448 |

Data 15 (Rotation Angle θs (°) Data of Correction Optical System)

| | Rotation Angle θc (°) of Camera Body | | | |
|---|---|---|---|---|
| | 0-85 | 85 | 90 | 105 |
| Wide - Intermediate | Retraction | Retraction | Retraction | Retraction |
| Intermediate - Tele | Retraction | -0.815 | 0.000 | 2.493 |

Data 16 (Other Data)

Difference Dcd between rotation center of camera in zenith direction imaging and curvature center of front surface of dome cover: 10 mm Difference Dfr between curvature center of front surface of dome cover and curvature center of rear surface of dome cover in zenith direction imaging:

0.2 mm

Decenter amount Sfr between surfaces of correction optical system on subject side and imaging surface side of camera body: 0.22 mm Distance Dsrc between subject side surface of correction optical system and rotation center of correction optical system in horizontal imaging: 80 mm Light shielding portion size: 2 mm×40 mm (X-axis direction×Y-axis direction)

Numerical Example 3

A dome camera according to Numerical Example 3 corresponds to the dome camera according to the third exemplary embodiment illustrated in FIGS. 8A to 8D. Presented hereinbelow are data 17 indicating shape data on the dome cover, data 18 indicating shape data on the correction optical system, data 19 indicating lens system focus position data at infinity in horizontal imaging, data 20 indicating decenter amount data of correction optical system, and data 21 indicating other data, concerning the dome camera according to Numerical Example 3.

| Data 17 (Shape Data on Dome Cover) | | | |
|---|---|---|---|
| r | d | nd | vd |
| 1 | 80 | d1 | 1.58 | 30 |
| 2 | 77 | d2 | | |

| | Zenith Direction Imaging | Horizontal Imaging |
|---|---|---|
| d1 | 2.7 | 3.0 |
| d2 | 8.3 | 26.0 |

| Data 18 (Shape Data on Correction Optical System) | | | |
|---|---|---|---|
| | r | d | nd | vd |
| 3 | 58.4994 | 2.1 | 1.54 | 56 |
| 4 | 58.3479 | 8.4 | | |

| Data 19 (Lens System Focus Position Data at Infinity in Horizontal Imaging) | | | |
|---|---|---|---|
| | Wide | Intermediate | Tele |
| d23 | 1.4720 | 3.9984 | 1.7983 |
| d25 | 2.1279 | 4.0047 | 11.9448 |

Data 20 (Decenter Amount ds (mm) Data of Correction Optical System)

| | Rotation Angle θc (°) of Camera Body | | | | | | | |
|---|---|---|---|---|---|---|---|---|
| | 0 | 15 | 30 | 45 | 60 | 75 | 90 | 105 |
| Wide - Intermediate | 0.00 | 0.00 | 0.00 | 0.00 | 0.00 | 0.00 | 0.00 | 0.00 |
| Intermediate - Tele | 0.00 | −2.59 | −5.00 | −7.07 | −8.66 | −9.66 | −10.00 | −9.66 |

Data 21 (Other Data) Difference Dcd between rotation center of camera in zenith direction imaging and curvature center of front surface of dome cover: 18 mm Difference Dfr between curvature center of front surface of dome cover and curvature center of rear surface of dome cover in zenith direction imaging:
0.3 mm Numerical Example 4

A dome camera according to Numerical Example 4 corresponds to the dome camera according to the fourth exemplary embodiment illustrated in FIGS. 10A to 10D. Presented hereinbelow are data 22 indicating shape data on the dome cover, data 23 indicating shape data on the correction optical system, data 24 indicating lens system focus position data at infinity in horizontal imaging, data 25 indicating rotation angle data of correction optical system rotation angle data, and data 26 indicating other data, concerning the dome camera according to Numerical Example 4.

| Data 22 (Shape Data on Dome Cover) | | | |
|---|---|---|---|
| r | d | nd | vd |
| 1 | 80 | d1 | 1.58 | 30 |
| 2 | 77 | d2 | | |

| | Zenith Direction Imaging | Horizontal Imaging |
|---|---|---|
| d1 | 2.0 | 3.0 |
| d2 | 13.1819 | 38.1819 |

| Data 23 (Shape Data on Correction Optical System) | | | |
|---|---|---|---|
| | r | d | nd | vd |
| 1 | 50.3553 | 2.5 | 1.8466 | 23.8 |
| 2 | 44.9161 | 9.0 | | |
| 3 | 45.8160 | 3.0 | 1.7174 | 29.5 |
| 4 | 49.5015 | 5.0 | | |

In this table, 1 and 2 are surface numbers of movable correction optical system, while 3 and 4 are surface numbers of fixed correction optical system.

| Data 24 (Lens System Focus Position Data at Infinity in Horizontal Imaging) | | | |
|---|---|---|---|
| | Wide | Intermediate | Tele |
| d23 | 1.4740 | 4.0564 | 2.4133 |
| d25 | 2.1259 | 3.9467 | 11.3298 |

Data 25 (Rotation Angle θs (°) Data of Correction Optical System)

| | Rotation Angle θc (°) of Camera Body | | | | | | | |
|---|---|---|---|---|---|---|---|---|
| | 0 | 15 | 30 | 45 | 60 | 75 | 90 | 105 |
| Wide - Intermediate | 0.00 | 0.00 | 0.00 | 0.00 | 0.00 | 0.00 | 0.00 | 0.00 |
| Intermediate - Tele | 0.00 | 1.63 | 3.16 | 4.46 | 5.47 | 6.10 | 6.31 | 6.10 |

Data 26 (Other Data)
Difference Dcd between rotation center of camera in zenith direction imaging and curvature center of front surface of dome cover: 26 mm
Difference Dfr between curvature center of front surface of dome cover and curvature center of rear surface of dome cover in zenith direction imaging:
1.0 mm Distance between surface 1 of correction optical system and rotation center of correction optical system: 35.1274 mm Numerical Example 5

A dome camera according to Numerical Example 5 corresponds to the dome camera according to the fifth exemplary embodiment illustrated in FIGS. 12A to 12D. Presented hereinbelow are data 27 indicating shape data on the dome cover, data 28 indicating shape data on the correction optical system, data 29 indicating lens system focus position data at infinity in horizontal imaging, data 30 indicating decenter amount of correction optical system and rotation angle data, and data 31 indicating other data, concerning the dome camera according to Numerical Example 5.

Data 27 (Shape Data on Dome Cover)

| | ry | rx | d | nd | vd |
|---|---|---|---|---|---|
| 1 | 80 | 80 | d1 | 1.58 | 30 |
| 2 | 77 | 77 | d2 | | |

| | Zenith Direction Imaging | Horizontal Imaging |
|---|---|---|
| d1 | 2.0 | 3.0 |
| d2 | 13.1819 | 38.1819 |

Data 28 (Shape Data on Correction Optical System)

| | r | d | nd | vd |
|---|---|---|---|---|
| 1 | 85.9232 | 2.5 | 1.8466 | 23.8 |
| 2 | 87.7354 | 9.0 | | |
| 3 | 670.5762 | 3.0 | 1.8466 | 23.8 |
| 4 | 500.0000 | 5.0 | | |

In this table, 1 and 2 are surface numbers of movable correction optical system, while 3 and 4 are surface numbers of fixed correction optical system.

Data 29 (Lens System Focus Position Data at Infinity in Horizontal Imaging)

| | Wide | Intermediate | Tele |
|---|---|---|---|
| d23 | 1.4750 | 4.0544 | 2.3833 |
| d25 | 2.1249 | 3.9487 | 11.3598 |

Data 30 (Shift Amount Data of Correction Optical System (Zoom Entire Area))

| | Rotation Angle $\theta c$ (°) of Camera Body | | | | | | | |
|---|---|---|---|---|---|---|---|---|
| | 0 | 15 | 30 | 45 | 60 | 75 | 90 | 105 |
| Decenter Amount ds (mm) | 0 | 0.75 | 1.50 | 2.25 | 2.99 | 3.74 | 4.49 | 5.24 |
| Rotation Angle $\theta s$ (°) | 0 | −2.59 | −5.00 | −7.07 | −8.66 | −9.66 | −10.00 | −9.66 |

Data 31 (Other Data)
Difference Dcd between rotation center of camera in zenith direction imaging and curvature center of front surface of dome cover: 26 mm Difference Dfr between curvature center of front surface of dome cover and curvature center of rear surface of dome cover in zenith direction imaging:
1.0 mm Numerical Example 6

A dome camera according to Numerical Example 6 corresponds to the dome camera according to the sixth exemplary embodiment illustrated in FIGS. 14A to 14D. Presented hereinbelow are data 32 indicating surface data, data 33 indicating aspherical surface data, and data 34 indicating various types of data, concerning a lens system included in the dome camera according to Numerical Example 6.

Data 32 (Lens System Surface Data)

| Surface No. | r | d | nd | vd |
|---|---|---|---|---|
| 1 | 89.50180 | 1.60000 | 1.74077 | 27.8 |
| 2 | 41.38760 | 5.65950 | 1.49700 | 81.6 |
| 3 | 2492.15590 | 0.20000 | | |
| 4 | 42.71860 | 3.74700 | 1.49700 | 81.6 |
| 5 | 199.64020 | 0.20000 | | |
| 6 | 33.96070 | 3.31520 | 1.59282 | 68.6 |
| 7 | 99.41370 | Variable | | |
| 8 | 68.57310 | 0.70000 | 2.00100 | 29.1 |
| 9 | 11.27000 | 3.05760 | | |
| 10* | −110.00830 | 0.70000 | 1.88202 | 37.2 |
| 11* | 13.17730 | 0.10000 | | |
| 12 | 11.42680 | 3.39720 | 1.94595 | 18.0 |
| 13 | −910.03020 | 1.00000 | | |
| 14* | −20.95590 | 0.60000 | 1.61881 | 63.9 |
| 15* | 18.99920 | Variable | | |
| 16 (Stop) | ∞ | 1.50000 | | |
| 17 | 11.89110 | 1.73420 | 1.65800 | 36.9 |
| 18* | 17.33770 | Variable | | |
| 19* | 15.27700 | 4.04490 | 1.51760 | 63.5 |
| 20* | −15.64970 | 0.41440 | | |
| 21 | 32.20130 | 3.15600 | 1.59282 | 68.6 |
| 22 | −13.76120 | 8.65500 | 1.84666 | 23.8 |
| 23 | −48.13140 | Variable | | |
| 24 | −1215.69890 | 0.50000 | 1.88300 | 40.8 |
| 25 | 8.14280 | Variable | | |
| 26 | 9.61930 | 2.11200 | 1.54814 | 45.8 |
| 27 | −40.48110 | (BF) | | |
| Image Surface | ∞ | | | |

Data 33 (Lens System Aspherical Surface Data)

10th Surface

K = 0.00000E+00, A4 = −8.58039E−07, A6 = −1.38793E−07, A8 = 0.00000E+00 A10 = 0.00000E+00
11th Surface K = 0.00000E+00, A4 = 7.23193E−05, A6 = 5.88012E−07, A8 = 0.00000E+00 A10 = 0.00000E+00
14th Surface K = 0.00000E+00, A4 = −1.56319E−05, A6 = 4.83208E−06, A8 = −1.36351E−07 A10 = 1.30599E−09
15th Surface K = 0.00000E+00, A4 = −1.15389E−04, A6 = 4.16115E−06, A8 = −1.24416E−07 A10 = 1.37336E−09
18th Surface K = 0.00000E+00, A4 = 7.17034E−05, A6 = 5.63664E−07, A8 = 0.00000E+00 A10 = 0.00000E+00
19th Surface K = 0.00000E+00, A4 = −7.57681E−05, A6 = 2.66279E−07, A8 = 0.00000E+00 A10 = 0.00000E+00

-continued

Data 33 (Lens System Aspherical Surface Data)

20th Surface

K = 0.00000E+00, A4 = 7.09786E-05, A6 = 1.49377E-07,
A8 = 0.00000E+00 A10 = 0.00000E+00

Data 34 (Lens System Various Data)
Zoom Ratio 27.56613

|  | Wide | Intermediate | Tele |
|---|---|---|---|
| Focal Distance | 4.5200 | 24.5001 | 124.5993 |
| F number | 1.63339 | 4.05517 | 5.33997 |
| Angle of View | 37.1333 | 7.3579 | 1.4557 |
| Image Height | 3.2200 | 3.2200 | 3.2200 |
| Full Lens Length | 106.0073 | 106.0154 | 106.0046 |
| BF | 3.80749 | 3.81579 | 3.80494 |
| d7 | 0.5000 | 19.2660 | 27.3725 |
| d15 | 28.6029 | 9.8368 | 1.7304 |
| d18 | 12.1039 | 6.7204 | 0.5000 |
| d23 | 1.6000 | 4.5098 | 3.4567 |
| d25 | 2.0000 | 4.4736 | 11.7471 |

In this table, d23 and d25 are focus position data at infinity in zenith direction imaging.

Presented hereinbelow are data 35 indicating lens system focus position data at infinity in horizontal imaging, data 36 indicating shape data on dome cover, data 37 indicating decenter amount data of correction optical system, and data 38 indicating other data, concerning the dome camera according to Numerical Example 6.

Data 35 (Lens System Focus Position Data
at Infinity in Horizontal Imaging)

|  | Wide | Intermediate | Tele |
|---|---|---|---|
| d23 | 1.5985 | 4.5072 | 3.3990 |
| d25 | 2.0015 | 4.4763 | 11.8049 |

Data 36 (Shape Data on Dome Cover)

|  | r | d | nd | vd |
|---|---|---|---|---|
| 1 | 80 | d1 | 1.58 | 30 |
| 2 | 77 | d2 |  |  |

|  | Zenith Direction Imaging | Horizontal Imaging |
|---|---|---|
| d1 | 2.4 | 3.0 |
| d2 | 8.6 | 26.0 |

Data 37 (Decenter Amount ds (mm) Data in Direction Perpendicular
to Optical Axis of Correction Optical System)

Rotation Angle θc (°) of Camera Body

|  | 0 | 15 | 30 | 45 | 60 | 75 | 90 | 105 |
|---|---|---|---|---|---|---|---|---|
| Wide | 0.00 | 0.00 | 0.00 | 0.00 | 0.00 | 0.00 | 0.00 | 0.00 |
| Intermediate | 0.00 | -0.04 | -0.07 | -0.10 | -0.12 | -0.13 | -0.14 | -0.13 |
| Tele | 0.00 | -0.07 | -0.13 | -0.19 | -0.23 | -0.26 | -0.27 | -0.26 |

In data 32, 14 and 15 are surface numbers of correction optical system.

Data 38 (Other Data)

Difference Dcd between rotation center of camera in zenith direction imaging and curvature center of front surface of dome cover: 20 mm Difference Dfr between curvature center of front surface of dome cover and curvature center of rear surface of dome cover in zenith direction imaging:

06 mm

Numerical Example 7

A dome camera according to Numerical Example 7 corresponds to the dome camera according to the seventh exemplary embodiment illustrated in FIGS. 17A to 17D. Presented hereinbelow are data 39 indicating surface data, data 40 indicating aspherical surface data, and data 41 indicating various types of data, concerning a lens system included in the dome camera according to Numerical Example 7.

Data 39 (Lens System Surface Data)

| Surface No. | r | d | nd | vd |
|---|---|---|---|---|
| Object Surface | ∞ |  |  |  |
| 1 | 118.72590 | 1.60000 | 1.74077 | 27.8 |
| 2 | 45.17710 | 5.54570 | 1.49700 | 81.6 |
| 3 | -769.56540 | 0.20000 |  |  |
| 4 | 43.73870 | 3.75860 | 1.49700 | 81.6 |
| 5 | 228.34700 | 0.20000 |  |  |
| 6 | 31.63660 | 3.44580 | 1.59282 | 68.6 |
| 7 | 89.13710 | Variable |  |  |
| 8 | 61.98580 | 0.70000 | 2.00100 | 29.1 |
| 9 | 11.98720 | 3.04220 |  |  |
| 10* | -144.73910 | 0.70000 | 1.88202 | 37.2 |
| 11* | 10.50170 | 0.21910 |  |  |
| 12 | 11.33650 | 3.70980 | 1.94595 | 18.0 |
| 13 | -76.78180 | 0.55200 |  |  |
| 14* | -22.65100 | 0.60000 | 1.77200 | 50.0 |
| 15 | 26.87880 | Variable |  |  |
| 16 (Stop) | ∞ | 1.50000 |  |  |
| 17 | 11.90780 | 1.30000 | 1.55332 | 71.7 |
| 18* | 17.94410 | Variable |  |  |
| 19* | 15.19270 | 4.18130 | 1.52500 | 70.3 |
| 20* | -18.15230 | 1.75230 |  |  |
| 21 | 22.12860 | 2.87340 | 1.59282 | 68.6 |
| 22 | -17.01720 | 6.57590 | 1.84666 | 23.8 |
| 23 | -60.13100 | Variable |  |  |
| 24 | -167.92120 | 0.50000 | 1.88300 | 40.8 |
| 25 | 8.00260 | Variable |  |  |
| 26 | 10.19640 | 2.00930 | 1.54814 | 45.8 |
| 27 | -42.69200 | (BF) |  |  |
| Image Surface | ∞ |  |  |  |

Data 40 (Lens System Aspherical Surface Data)

10th Surface

K = 0.00000E+00, A4 = -6.73841E-05, A6 = -6.22541E-08
11th Surface

K = 0.00000E+00, A4 = -2.50048E-05, A6 = -4.53911E-08
14th Surface

K = 0.00000E+00, A4 = 9.29893E-05, A6 = 0.00000E+00
18th Surface

K = 0.00000E+00, A4 = 7.95089E-05, A6 = 4.74391E-07

-continued

Data 40 (Lens System Aspherical Surface Data)

19th Surface

K = 0.00000E+00, A4 = −6.29391E−05, A6 = 1.35845E−07

20th Surface

K = 0.00000E+00, A4 = 5.90291E−05, A6 = 7.52657E−08

Data 41 (Lens System Various Data)
Zoom Ratio 27.56611

|  | Wide | Intermediate | Tele |
|---|---|---|---|
| Focal Distance | 4.5200 | 24.4999 | 124.5994 |
| F number | 1.56312 | 3.69610 | 5.86571 |
| Angle of View | 37.1604 | 7.3794 | 1.4569 |
| Image Height | 3.2200 | 3.2200 | 3.2200 |
| Full Lens Length | 106.0025 | 106.0192 | 106.0082 |
| BF | 3.80270 | 3.81961 | 3.80846 |
| d7 | 0.5000 | 19.6233 | 26.6685 |
| d15 | 27.8373 | 8.7140 | 1.6688 |
| d18 | 14.2971 | 9.5180 | 0.5000 |
| d23 | 1.6000 | 3.8735 | 3.3105 |
| d25 | 2.0000 | 4.5054 | 14.0865 |

In this table, d23 and d25 are focus position data at infinity in zenith direction imaging.

Presented hereinbelow are data 42 indicating lens system focus position data at infinity in horizontal imaging, data 43 indicating shape data on the dome cover, data 44 indicating tilt angle data of correction optical system, and data 45 indicating other data, concerning the dome camera according to Numerical Example 7.

Data 42 (Lens System Focus Position Data at Infinity in Horizontal Imaging)

|  | Wide | Intermediate | Tele |
|---|---|---|---|
| d23 | 1.5998 | 3.8723 | 3.2806 |
| d25 | 2.0002 | 4.5068 | 14.1166 |

Data 43 (Shape Data on Dome Cover)

|  | r | d | nd | vd |
|---|---|---|---|---|
| 1 | 80 | d1 | 1.54 | 56 |
| 2 | 77 | d2 |  |  |

|  | Zenith Direction Imaging | Horizontal Imaging |
|---|---|---|
| d1 | 2.4 | 3.0 |
| d2 | 8.6 | 26.0 |

Data 44 (Tilt Angle θs (°) Data of Correction Optical System)

| | Rotation Angle θc (°) of Camera Body | | | | | | | |
|---|---|---|---|---|---|---|---|---|
|  | 0 | 15 | 30 | 45 | 60 | 75 | 90 | 105 |
| Wide - Intermediate | 0.00 | 0.00 | 0.00 | 0.00 | 0.00 | 0.00 | 0.00 | 0.00 |
| Tele | 0.00 | −0.11 | −0.22 | −0.31 | −0.38 | −0.43 | −0.44 | −0.43 |

In data 39, 17 and 18 are surface numbers of correction optical system. Rotation center is surface top of object side surface (surface 17).

Data 45 (Other Data)

Difference Dcd between rotation center of camera in zenith direction imaging and curvature center of front surface of dome cover: 20 mm Difference Dfr between curvature center of front surface of dome cover and curvature center of rear surface of dome cover in zenith direction imaging:

0.6 mm

Table 1 presented below indicates values for respective conditions for the dome cameras used in the respective numerical examples.

TABLE 1

| Numerical Example 1 | Condition (1): 1.00 |
|---|---|
|  | Condition (2): 1.00 |
| Numerical Example 2 | Condition (1): 1.00 |
|  | Condition (2): 1.00 |
| Numerical Example 3 | Condition (3): 1.93 |
| Numerical Example 4 | Condition (3): 1.81 |
| Numerical Example 5 | Condition (3): 2.05 |
| Numerical Example 6 | Condition (4): 2.26 |
| Numerical Example 7 | Condition (4): 2.42 |

(Values for Conditions)

The respective exemplary embodiments have been described herein by way of example of the technology according to the present disclosure. The accompanying drawings and detailed explanation have been presented for this purpose.

Accordingly, respective constituent elements described and depicted in the detailed explanation and accompanying drawings may include not only constituent elements essential to solutions to problems, but also constituent elements presented only by way of example of the technology and not essential to solutions to problems. It should not be considered that the constituent elements other than the essential elements are essential only based on the fact that the constituent elements other than the essential elements are described or depicted in the detailed description or accompanying drawings.

The respective exemplary embodiments have been presented by way of examples only. Various modifications, replacements, additions, omissions or the like may be made without departing from the scope of the appended claims or equivalents.

The present disclosure is applicable to a monitoring camera, a security camera, and others.

What is claimed is:

1. A dome camera comprising:
 a camera body rotatable and including a lens system and an imaging device;
 a correction optical system having a curved shape; and
 a light-transmissive dome cover that includes a spherical portion containing a spherical surface and disposed at a zenith, includes a cylindrical portion having a cylindrical shape or a conical shape and disposed on an end side of the spherical portion, and covers the camera body and the correction optical system, wherein
 the correction optical system shifts from an outside of an angle of view of the camera body to an inside of the angle of view of the camera body in accordance with a rotation angle of the camera body, and
 the correction optical system is disposed between the lens system and the dome cover, and following conditions (1) and (2) are met:

$$0.7 < fgx/fd < 1.3 \quad (1)$$

$$0.7 < fgy/fd < 1.3 \quad (2)$$

where,
- fgx: synthesized focal distance of the correction optical system and cylindrical portion of the dome cover in a direction perpendicular to a vertex direction,
- fgy: synthesized focal distance of the correction optical system and cylindrical portion of the dome cover in the vertex direction, and
- fd: focal distance of the spherical portion of the dome cover.

2. The dome camera according to claim 1, wherein a position of the correction optical system shifts in a direction opposite to the zenith of the dome cover when the camera body directed in a horizontal direction rotates in a direction toward the zenith of the dome cover.

3. The dome camera according to claim 1, wherein a position of the correction optical system shifts in a direction toward the zenith of the dome cover when the camera body directed in a horizontal direction rotates in a direction opposite to the zenith of the dome cover.

4. The dome camera according to claim 1, wherein a rotation center of the camera body is located at a position shifted in a zenith direction of the dome cover from a spherical center position of the dome cover.

5. The dome camera according to claim 4, wherein an optical axis of the camera body directed in the horizontal direction becomes parallel with a line connecting an end of the spherical portion and a zenith side end of the correction optical system.

6. The dome camera according to claim 1, wherein the correction optical system shifts in parallel with a direction where a side surface of the cylindrical portion has larger curvature.

7. The dome camera according to claim 1, wherein the correction optical system is configured such that curvature in a vertex direction is different from curvature in a direction perpendicular to the vertex direction.

8. The dome camera according to claim 1, wherein the correction optical system has a flat surface.

9. The dome camera according to claim 1, wherein a surface of the correction optical system on a subject side of the camera body and a surface of the correction optical system on an image surface side of the camera body are decentered from each other.

10. The dome camera according to claim 1, wherein the lens system is a zoom lens system, and
the correction optical system shifts from the outside of the angle of view of the camera body to the inside of the angle of view of the camera body in accordance with a zooming position of the zoom lens system.

11. The dome camera according to claim 10, wherein the correction optical system retracts to an outside of an imaging range of the camera body when the zooming position of the zoom lens system is located in a range from a wide end to an intermediate position.

12. The dome camera according to claim 1, wherein the correction optical system includes a light shielding portion that shields light received at a part of the correction optical system.

13. The dome camera according to claim 1, wherein the correction optical system moves such that an optical axis becomes parallel with a line connecting a boundary between the cylindrical portion and the spherical portion of the dome cover and a zenith side end of the correction optical system.

* * * * *